United States Patent [19]
Baker et al.

[11] Patent Number: 5,777,601
[45] Date of Patent: Jul. 7, 1998

[54] SYSTEM AND METHOD FOR GENERATING VIDEO IN A COMPUTER SYSTEM

[75] Inventors: David C. Baker; Daniel P. Mulligan; Eric J. Schell, all of Austin, Tex.

[73] Assignee: Brooktree Corporation, San Diego, Calif.

[21] Appl. No.: 687,274

[22] Filed: Jul. 25, 1996

Related U.S. Application Data

[62] Division of Ser. No. 337,350, Nov. 10, 1994.

[51] Int. Cl.[6] .............................................. G09G 5/02
[52] U.S. Cl. .................................................. 345/154
[58] Field of Search ................................ 345/153, 154; 348/441, 453

[56] References Cited

U.S. PATENT DOCUMENTS

| | | | |
|---|---|---|---|
| 4,386,368 | 5/1983 | Banks | 358/150 |
| 4,412,250 | 10/1983 | Smith | 358/150 |
| 4,567,521 | 1/1986 | de la Guardia et al. | 358/150 |
| 4,606,068 | 8/1986 | Habitzreiter et al. | 382/56 |
| 4,719,503 | 1/1988 | Craver et al. | 358/12 |

(List continued on next page.)

FOREIGN PATENT DOCUMENTS

| | | | |
|---|---|---|---|
| 0 524 468 A2 | 1/1993 | European Pat. Off. | G09G 5/14 |
| 0 597 218 A1 | 5/1994 | European Pat. Off. | G09G 1/16 |
| 0 601 647 A1 | 6/1994 | European Pat. Off. | G09G 1/16 |
| 0 675 478 A1 | 10/1995 | European Pat. Off. | G09G 1/16 |
| WO 88/03305 | 5/1988 | WIPO | G09G 1/14 |

OTHER PUBLICATIONS

U.S. application No. 08/099,083, filed Jul. 29, 1993, for *System and Method for Processing Multiple Received Signal Sources*.

U.S. application No. 08/099,194, filed Jul. 29, 1993, for *Video Processing Apparatus, Systems and Methods*.

*Digital Video Processor, Video–Port Interface Techniques*, draft May 17, 1993, Pixel Semiconductor.

M. Leonard, *Teleconferencing Invades the Desktop*, Electronic Design, Aug. 6, 1992, pp. 47, 48, 50, 51.

Copies of Presentation Slides, Pixel Semiconductor, Jun. 1992.

Digital Video Processor, Preliminary Data Book, Jul. 1993, pp. C00001–C00229.

i750™ Microprocessor Family, Intel Corp., Feb. 1991, pp. BT035378–BT035496.

K. Jack, *Video Demystified a Handbook for the Digital Engineer*, 1993, pp. 106–196.

*Primary Examiner*—Jeffery Brier
*Attorney, Agent, or Firm*—William C. Cray; Susie H. Oh

[57] ABSTRACT

A system and method for generating composite video signals in a computer. Digital pixel data may be processed by software to form component video pixel data, which may include luminance and chrominance components. A chrominance look-up table is provided in a display memory and is used for modulation of the chrominance components. The modulated components are then combined to form digital composite video pixel data which may be stored in a frame buffer in the display memory. Video control information is precalculated and stored in the display memory in advance. The digital composite video pixel data and video control information are then recovered from the display memory to produce a formatted stream of video data. The architecture of this system greatly reduces hardware complexity and bandwidth requirements. In addition, the process may be controlled by a media stream controller which is also adapted for audio and graphics processing. This allows the display memory and various other components to be shared by multiple media subsystems.

18 Claims, 12 Drawing Sheets

U.S. PATENT DOCUMENTS

| | | | |
|---|---|---|---|
| 4,740,832 | 4/1988 | Sprague et al. | 358/21 |
| 4,755,937 | 7/1988 | Glier | 364/200 |
| 4,872,054 | 10/1989 | Gray et al. | 348/441 |
| 5,083,119 | 1/1992 | Trevett et al. | 340/723 |
| 5,093,722 | 3/1992 | Miyaguchi et al. | 458/140 |
| 5,103,309 | 4/1992 | Hara | 358/141 |
| 5,119,176 | 6/1992 | Stec et al. | 358/11 |
| 5,192,999 | 3/1993 | Graczyk et al. | 358/85 |
| 5,229,855 | 7/1993 | Siann | 358/183 |
| 5,241,281 | 8/1993 | Wilkes et al. | 340/799 |
| 5,243,447 | 9/1993 | Bodenkamp et al. | 345/133 |
| 5,245,322 | 9/1993 | Dinwiddie, Jr. et al. | 345/115 |
| 5,258,750 | 11/1993 | Malcom, Jr. et al. | 340/721 |
| 5,262,861 | 11/1993 | Herz | 358/150 |
| 5,268,756 | 12/1993 | Vavreck et al. | 358/140 |
| 5,272,520 | 12/1993 | Kanoh et al. | 358/11 |
| 5,276,458 | 1/1994 | Sawdon | 345/132 |
| 5,283,819 | 2/1994 | Glick et al. | 379/90 |
| 5,293,483 | 3/1994 | Mizobata | 395/164 |
| 5,327,156 | 7/1994 | Masukane et al. | 345/113 |
| 5,333,135 | 7/1994 | Wendorf | 370/94.1 |
| 5,333,299 | 7/1994 | Koval et al. | 395/550 |
| 5,355,391 | 10/1994 | Horowitz et al. | 375/36 |
| 5,369,617 | 11/1994 | Munson | 365/219 |
| 5,371,518 | 12/1994 | Hannah | 345/200 |
| 5,377,018 | 12/1994 | Rafferty | 358/433 |
| 5,392,407 | 2/1995 | Heil et al. | 395/325 |
| 5,402,147 | 3/1995 | Chen et al. | 345/115 |
| 5,406,306 | 4/1995 | Siann et al. | 345/115 |
| 5,420,643 | 5/1995 | Romesburg et al. | 348/581 |
| 5,426,731 | 6/1995 | Masukane et al. | 395/162 |
| 5,455,627 | 10/1995 | Eitzmann et al. | 348/441 |
| 5,455,628 | 10/1995 | Bishop | 348/446 |
| 5,510,852 | 4/1996 | Shyu | 345/154 |
| 5,519,438 | 5/1996 | Elliott et al. | 348/180 |
| 5,555,030 | 9/1996 | Takamoto et al. | 348/642 |

SYSTEM AND METHOD FOR GENERATING VIDEO IN A COMPUTER SYSTEM

This application is a divisional of copending application Ser. No. 08/337,350, filed Nov. 10, 1994.

BACKGROUND OF THE INVENTION

1. Field of the Invention

The field of the present invention relates in general to a system for, and method of, generating video in a computer system. More particularly, the field of the invention relates to a system and method for converting digital pixel data into a composite video signal for output to an analog video device, such as a monitor, VCR, or the like.

2. Background

Personal computers and work stations have evolved rapidly since their introduction nearly twenty years ago. Dramatic advances in processor, display and audio technology have transformed the personal computer into a multimedia appliance, capable of combining color graphics, video, and stereo sound in a single software application.

However, most conventional systems require separate bus devices to support graphics, video, and sound. In fact, most sound devices are attached to the expansion bus, while graphics and video devices have migrated to the local bus to take advantage of higher data transfer rates.

Unfortunately, this piecemeal approach to providing multimedia capabilities has led to the development of separate graphics, video, and audio subsystems having independent controllers with incompatible data types. This may lead to wasted memory space and memory bandwidth, duplicated bus interface logic, and wasted CPU cycles to manage independent subsystems.

What is needed is an apparatus and method for combining graphics, video, and audio in a single bus device, using a single bus interface. Preferably, such a system would allow the sharing of a single buffer and other components for use in various multimedia applications, including audio, graphics, video input, and video output.

Incorporating video into such a system poses particular challenges. Video data consumes high bandwidth and memory, and conversion of digital pixel data to a composite video signal requires complex hardware for data conversion and the generation of timing signals. A variety of steps must be taken to generate a composite video signal from digital pixel data. These steps may include color space conversion, composite luminance generation, chrominance and subcarrier generation, horizontal and vertical synchronization, and digital to analog conversion. See Keith Jack, *Video Demystified, A Handbook for the Digital Engineer*, at 106–196 (HighText 1993) (hereinafter *"Video Demystified"*) which is hereby specifically incorporated herein by reference.

Data used in computer graphics and imaging systems typically uses the red, green, and blue (RGB) color space format and must be converted to a video or broadcast format to produce composite video signals. In typical RGB graphics systems each pixel on the display is assigned different levels of red, green, and blue which are combined to determine the color of the pixel. Video and broadcast formats, on the other hand, typically have luminance components representing intensity and modulated chrominance components providing color information. Some common video formats include NTSC (National Television System Committee), PAL (Phase Alternation Line), and SECAM (Sequential Color with Memory).

In addition, a variety of other conversions and information must be provided for composite video signals. When video is displayed on a television (or output on another video device), a screen is made using two fields, each one containing half of the scan lines needed to make up one frame of video. One field contains the even-numbered scan lines while the other field is made up of the odd-numbered scan lines. Fields only exist for interlaced scanning systems. An interlaced system is one where two (in general —it could be more, but two is most common) interleaved fields are used to scan out one video frame. Therefore, the number of lines in a field are one-half of the number of lines in a frame. In NTSC, there are 262.5 lines per field (525 lines per frame) while there are 312.5 lines per field in PAL. The two fields are interlaced, which means that all of the odd numbered lines are contained in one field, while the other field is made up of all the even-numbered lines. In NTSC, PAL and SECAM, every other scan line belongs to the same field. Each field is drawn on the screen consecutively—first one field, then the other. Many computer monitors, on the other hand, are non-interlaced and the graphics data is not provided in separate fields.

After each line of video data, and after each field, blanking information is provided to the screen. On the screen, the scan line moves from the left edge to the right edge, jumps back to the left edge, and starts out all over again, on down the screen. When the scan line hits the right-hand limit and is about to be brought back to the left-hand edge, the video signal is blanked so that the return path of the scan beam from the right to the left-hand edge is not visible. This is referred to as horizontal blanking. Vertical blanking is also provided at the end of each field to allow the scan line to move from the bottom of the screen to the top.

In addition, other video control information is provided after each line and field as is known in the art. For instance, synchronization is provided with a sync signal. Essentially, the sync signal tells the display where to put the picture. The horizontal sync, or HSYNC for short, tells the display where to put the picture in the left-to-right dimension, while the vertical sync (VSYNC) tells the display where to put the picture from top-to-bottom. In order to provide an analog composite video signal, blanking, synchronization and other information must be generated and inserted in the video stream. For more information on video formats, see *Video Demystified* which is incorporated herein by reference.

Conventional systems for converting digital video data to an analog composite video signal typically consist of integrated circuit devices and may include significant analog circuitry. These systems have involved conversion of digital data into analog signals at various incremental stages in the processing and complete the conversion by further processing the resulting analog signal. These conventional systems suffer from problems associated with analog processing of signals, such as circuitry whose response varies with temperature, the necessity for making frequency, phase, and level adjustments, and the relatively high cost of analog circuitry. See U.S. Pat. No. 5,119,176 at col. 2, lines 16–26. Predominantly digital systems, on the other hand, may use look-up tables in a dedicated RAM or ROM for coefficients for the luminance and chrominance components. While this may provide an efficient method for converting the video data, it requires additional memory that may be wasted when video data is not being processed. What is needed is a means for allowing this memory to be efficiently used by other media subsystems when video data is not being processed.

In addition, predominantly digital systems must provide horizontal and vertical video control information (including blanking and synchronization) as part of the digital stream. If this information is generated at the front end of the system, the bandwidth required for processing the video data is increased throughout the data path. On the other hand, if this information is generated and inserted by an integrated circuit encoder near the end of the encoding process, complex logic and timing signals may be required. What is needed is a relatively simple, preferably digital, means for inserting video control information into a stream of video data without significantly increasing the bandwidth required. What is also needed is a method of conserving memory used to store video data without significantly increasing the cost or complexity of the processing hardware.

Conventional systems also typically require digital filters, multipliers, and other hardware that adds to the cost and complexity of the system. In addition, different hardware configurations may be required to support different video formats. What is needed is a system and method for generating composite video in different formats using substantially the same hardware components without requiring digital filters, multipliers and other complex hardware.

SUMMARY OF THE INVENTION

One aspect of the present invention provides a system and method for providing composite video signals from a digital computer. Preferably, video data is preprocessed by software and the hardware is largely format independent. It is an advantage of these and other aspects of the present invention that multiple video formats may be flexibly supported. It is another advantage that hardware design is simplified.

Yet another aspect of the present invention provides a multimedia subsystem combining video, graphics and sound. Another aspect of the present invention provides a display memory that is used to store active video and video control information as well as data for graphics and sound. It is an advantage of these and other aspects of the present invention that multiple, incompatible subsystems for graphics, video and sound may be eliminated. It is another advantage of these and other aspects of the present invention that the number of memories and other components may be reduced.

Another aspect of the present invention provides a data structure in a memory for storing video output data. This structure may be preloaded with video related data that is output after each line, field and/or screen. This video related data may include blanking, color bursts, synchronization and other video control information.

It is an advantage of these and other aspects of the present invention that complex hardware is not required to generate certain video related signals such as signals for video control information. These signals may be generated in advance and stored in a memory for reuse with different active video data. In addition, it is an advantage that bandwidth may be reduced since video related data that must be repeated in the video stream only needs to be loaded into the memory once.

Another aspect of the present invention provides for compression of video related data in a memory. In particular, video related data may be selectively compressed. Repetitive video related data, such as video control information, may be compressed and preloaded into a memory while active video data may be written into the memory in uncompressed form. It is an advantage of these and other aspects of the present invention that memory and bandwidth requirements are reduced. It is a further advantage that processing logic is simplified since active video data need not be compressed. Rather, those portions of the video data where compression is the greatest may be selectively compressed.

Yet another aspect of the present invention provides selective decoding of compressed data. This is preferably performed at the back end of the video encoding process. It is an advantage of this aspect that memory and bandwidth requirements may be reduced.

Still another aspect of the present invention provides a look-up table for modulated chrominance data. Preferably, modulation occurs at a rate that allows a clock to be shared with other media subsystems. It is an advantage of these and other aspects of the present invention that computation of modulated chrominance is greatly simplified and that components may be shared among media subsystems. Another aspect of the present invention provides a sample clock rate that allows simplified modulation logic. Preferably, the sample clock rate is four times the frequency of the chrominance subcarrier. It is an advantage of this aspect of the present invention that the modulation logic is greatly simplified and neither a look-up table nor complicated analog circuitry is required.

BRIEF DESCRIPTION OF THE DRAWINGS

These and other features and advantages of the present invention will become more apparent to those skilled in the art from the following detailed description in conjunction with the appended drawings in which.

GLOSSARY OF TERMS

Figure 1A:
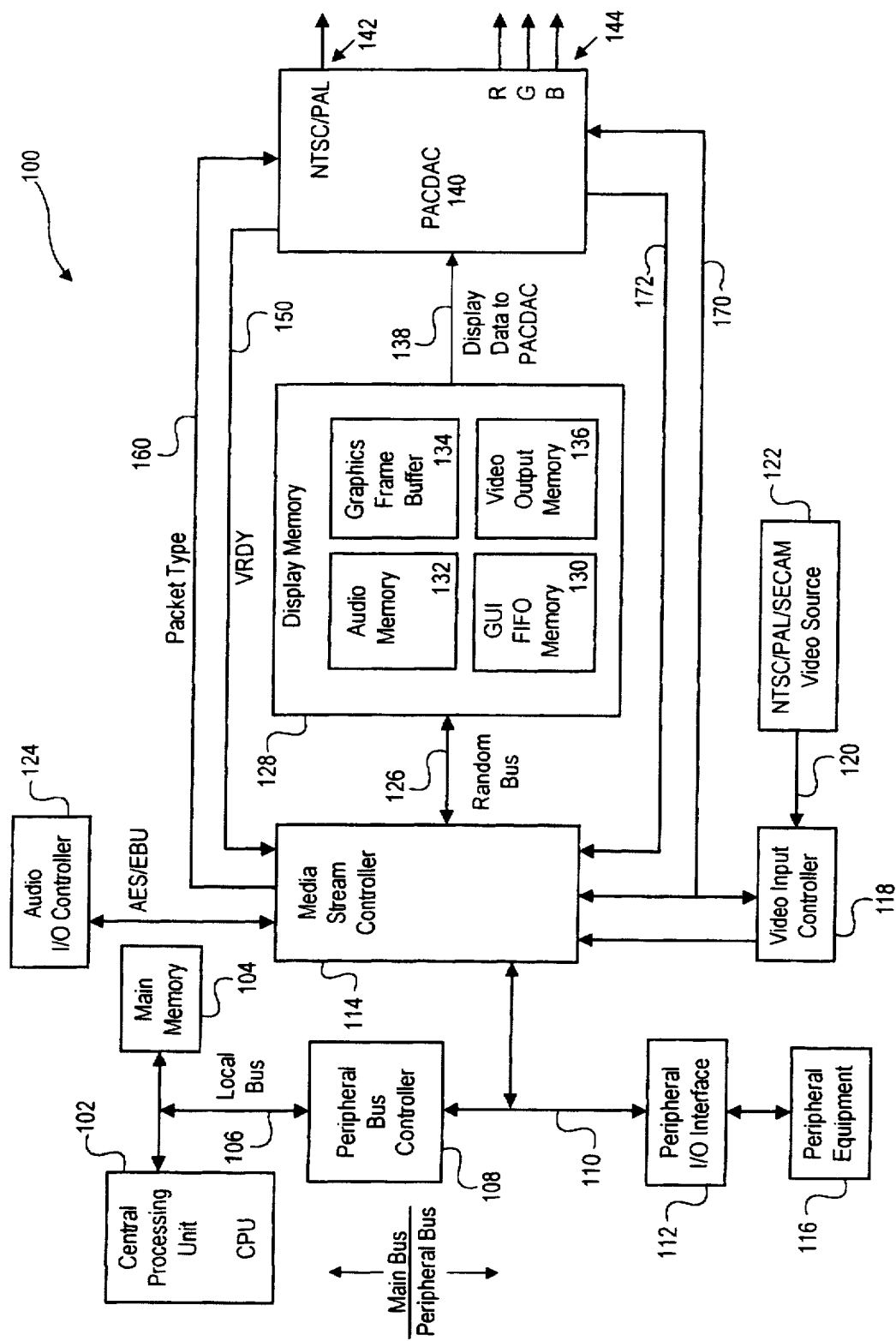
FIG. 1A is a simplified block diagram illustrating a system according to a first embodiment of the present invention for generating a composite video signal in a personal computer.

A "Frame" is video data for one screen or picture out of a video stream. The video data may be digital or analog and may be in compressed or uncompressed format. For purposes hereof, a frame may contain both active video and video control information and may contain multiple fields.

"Active Video" is video data that is used to determine intensity and/or color. This video data is typically divided into pixels, and may be in digital or analog form.

"Video Control Information" is video data that is used for purposes other than determining intensity and color. This video data is typically inserted after a line, field, or screen of active video. This video data may include, but is not limited to, horizontal or vertical blanking, horizontal or vertical synchronization, and/or color burst. This video data may be in digital or analog form.

A "Field" is video data for a set of lines that make up part of one screen or picture out of a video stream. For interlaced systems, a frame usually has two fields. One field contains the even-numbered lines of video data while the other field is made up of the odd-numbered lines of video data. In an interlaced system, each field is displayed in its entirety—therefore, all of the odd-numbered lines are displayed, then the even, then the odd, and so on.

A "Pixel", which is short for picture element, is the smallest division that makes up a picture. Typically, this is the smallest area over which intensity and color is the same. A physical pixel represents an area on a screen of graphics or video. A pixel in memory represents a data point for a portion of a picture. A pixel in memory may not map to a single physical pixel if the resolution of the physical screen is different from the resolution of the picture as stored in memory.

"Pixel Data" is data representative of the color and/or intensity of a video or graphics pixel.

"Component Pixel Data" is pixel data that must be combined with other pixel data to determine the color and intensity of a pixel. For instance, in the red, green, and blue (RGB) color space, each pixel has three pieces of component pixel data—a red component, a green component, and a blue component. Most video formats also have three pieces of component pixel data—a luminance component representing intensity and two chrominance components representing color. Component pixel data may be either modulated or unmodulated. Typically, for the NTSC video format, for instance, the component pixel data includes a luminance component (Y) and two unmodulated chrominance components (U and V). The chrominance components are modulated (U sin ωt and V cos ωt, where $\omega = 2\pi F_{sc}$) before being combined to form a composite video signal.

"Composite Pixel Data" is data representative of the color and intensity of a video or graphics pixel. Typically, composite pixel data for video formats is a combination of the luminance and modulated chrominance components. For NTSC video format using the YUV color space, for instance, the components are combined according to Y+U sin ωt+V cos ωt, where ω equals 2π times the frequency of the subcarrier signal, $F_{sc}$.

"Digital Composite Video Data" is digitized video data containing both active video and video control information. Typically, this is a digitized waveform of a composite video signal, with specific digital values assigned to the sync, blank, and white level.

A "Composite Video Signal" is a single analog signal combining both active video and video control information.

DESCRIPTION

FIG. 1A is a simplified block diagram illustrating a system, generally indicated at 100, for producing a composite video signal in a personal computer according to a first embodiment of the present invention. Referring to FIG. 1A, this system includes a central processing unit (CPU) 102 and a main memory 104 for storing both executable instructions and data for the system. In the system of FIG. 1A, the CPU 102 and the main memory 104 are connected to a local bus 106. The system 100 shown in FIG. 1A also includes peripheral bus controller 108 connected to the local bus 106. Preferably, in the first embodiment, the peripheral bus controller 108 provides a PCI bus system although other bus systems may be supported. A peripheral bus 110 has a common connection with the peripheral bus controller 108, with a peripheral I/O interface 112 and with media stream controller 114. While the peripheral bus 110 is coupled to the local bus using peripheral bus controller 108 in the first embodiment, other embodiments of the present invention may be adapted to support other methods of connecting to the local bus, such as direct connection, buffered connection or connection through a combined cache/bridge. See Tom Shanley and Don Anderson, *PCI System Architecture*, PC System Architecture Series Volume 4 at 12–30 (MindShare Press 2nd ed. 1994), which is hereby specifically incorporated herein by reference.

Figure 1B:
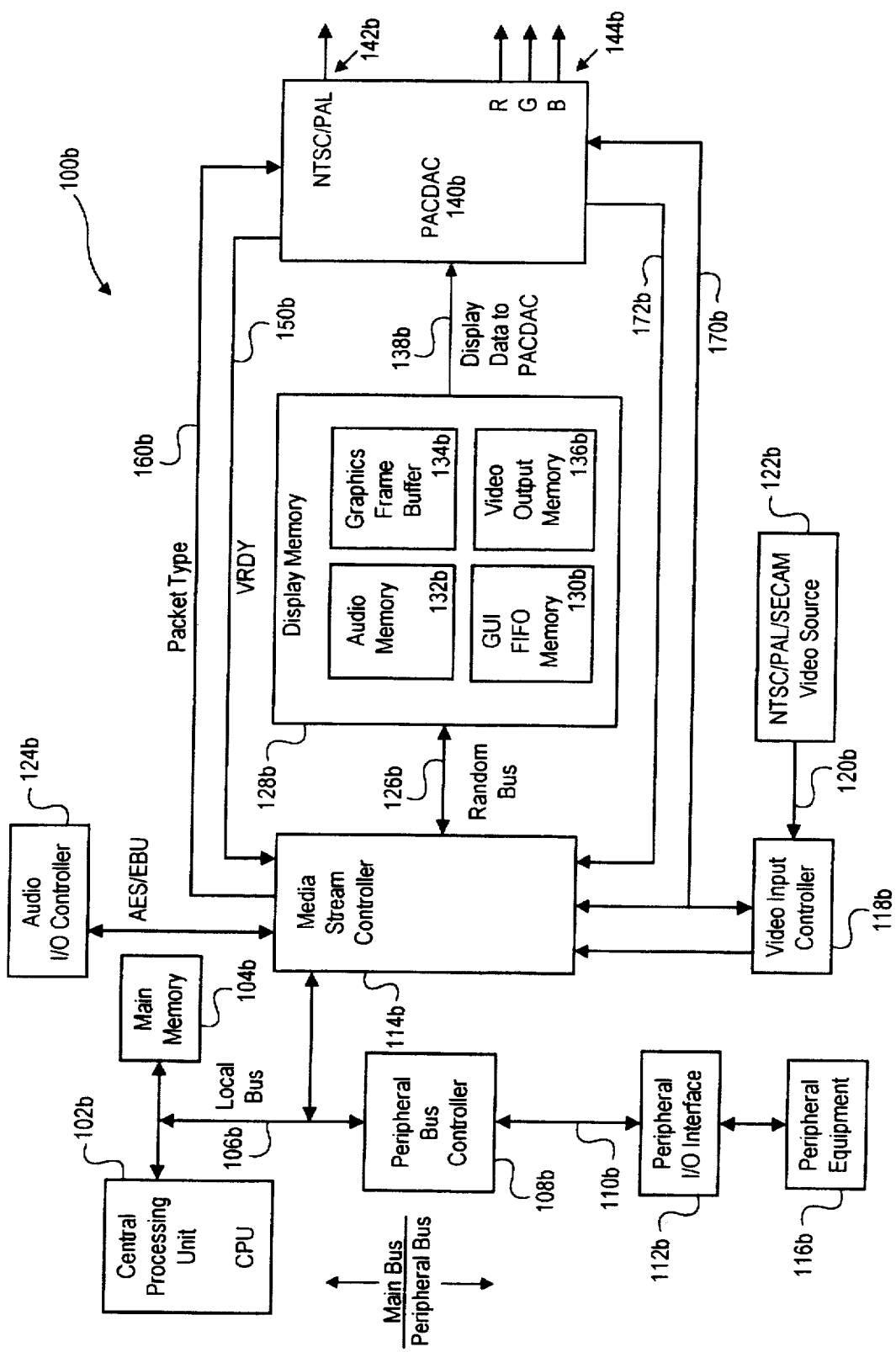
FIG. 1B is a simplified block diagram illustrating a system according to a second embodiment of the present invention.

In particular, FIG. 1B illustrates a system according to a second embodiment of the present invention, generally indicated at 100b, that contains the same components as the first embodiment in FIG. 1A except that the media stream controller 114b is directly connected to the local bus 106b. Preferably, in the second embodiment, local bus 106b provides a VESA local bus system although other bus systems may be supported. In the embodiment shown in FIG. 1B, the stages are identified by the same numerals as the stages shown in FIG. 1A except that the stages are further designated by the suffix "b". However, in FIG. 1B it will be noted that the peripheral bus controller 108b is not interposed between the media stream controller 114b and the CPU 102b. Except for this difference, the system shown in FIG. 1B operates essentially the same as that shown in FIG. 1A. Because of this substantially common functionality, the system shown in FIG. 1B operates in a manner similar to that of FIG. 1A to generate composite video signals.

Figure 1C:
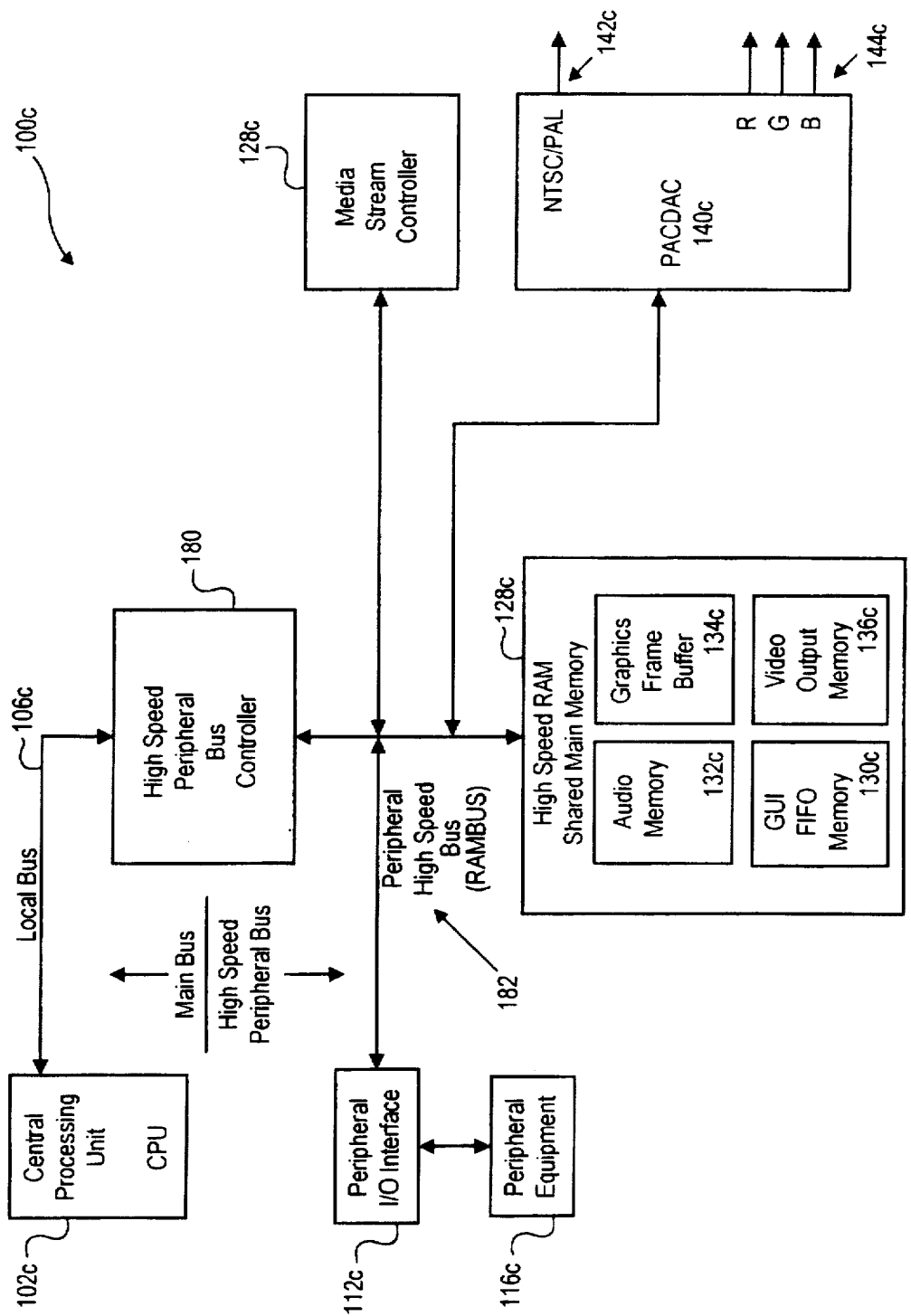
FIG. 1C is a simplified block diagram illustrating a system according to a third embodiment of the present invention.

FIG. 1C illustrates a third embodiment that is intended to operate in a system with a high-speed random-access-memory bus designated as "RAMBUS". The "RAMBUS" system is well known in the art. For example, International Application PCT/US 91/02590 published on Oct. 31, 1991, discloses such a system. The system shown in FIG. 1C has blocks corresponding to many of the blocks shown in FIG.s 1A and 1B but has a different arrangement of such blocks than the arrangements shown in FIG.s 1A and 1B. These blocks are identified in FIG. 1C with the same numerals as the blocks in FIGS. 1A and 1B but with the suffix "c".

The system shown in FIG. 1C is generally indicated at 100c. In the embodiment shown in FIG. 1C, a local bus 106c is connected between the CPU 102c and a high speed peripheral bus controller 180. All of the other stages in the system 100c and the peripheral bus controller 180 are connected to a high speed bus 182 (designated as "RAMBUS"). Thus, all of the communication between the different stages (other than the CPU 102c) occurs through the high speed bus 182.

Since essentially all of the communications occur through the high speed bus 182, the communications can occur at a faster rate than in the systems shown in FIGS. 1A and 1B. As will be appreciated, however, the embodiment shown in FIG. 1C has substantially the same advantages as the embodiments shown in FIGS. 1A and 1B.

Referring to FIG. 1A, the peripheral I/O interface 112 is connected to peripheral equipment 116. The peripheral bus 110 in the first embodiment may be a PCI bus which provides a data bandwidth of thirty two (32) bits in parallel and which may in the future provide as many as sixty four (64) bits in parallel. The peripheral equipment 116 may illustratively be a printer or disk drive which is operated in accordance with commands from the CPU 102. One of ordinary skill in the art will appreciate the interconnection and operation of these components.

Figure 2:
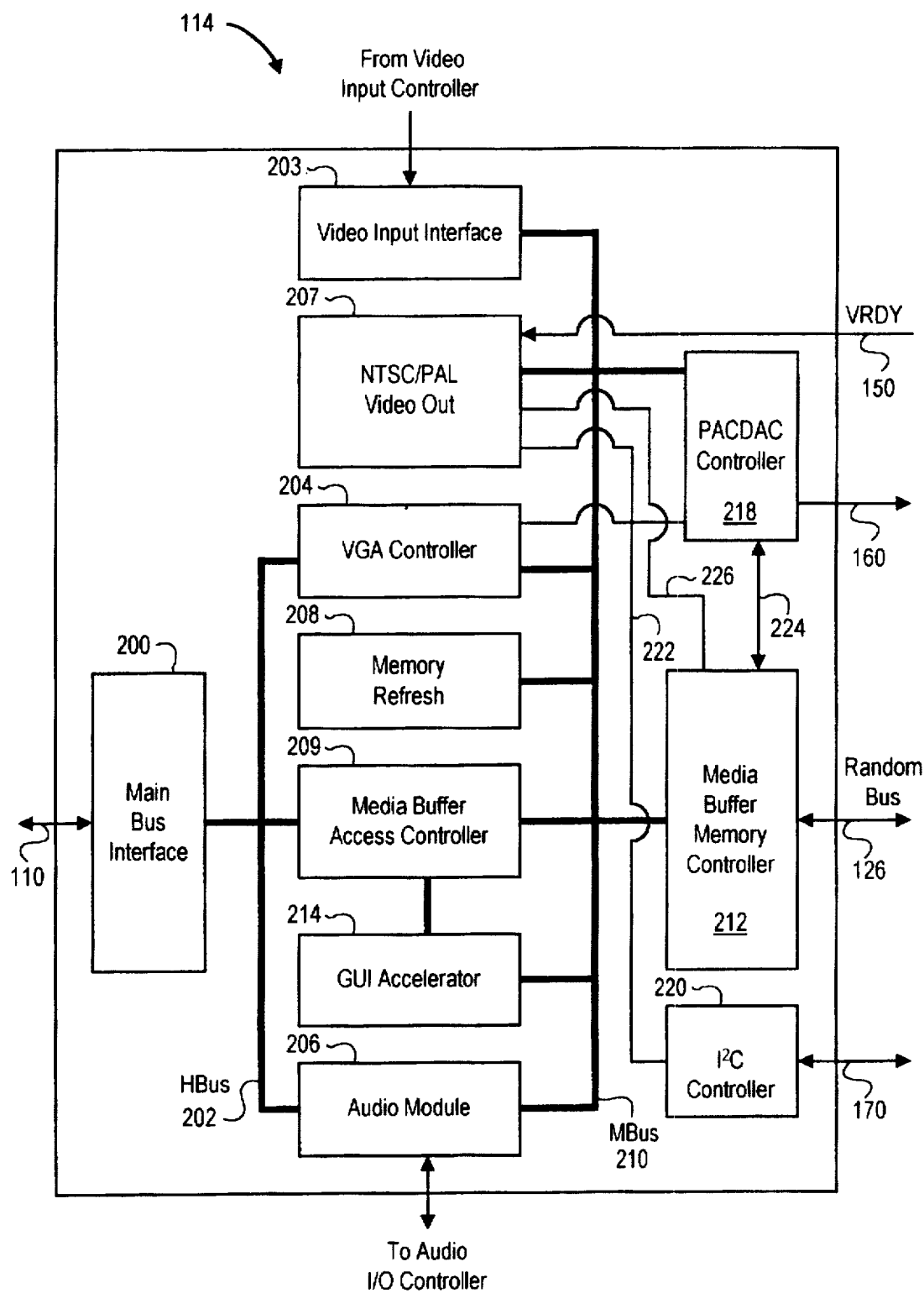
FIG. 2 is a block diagram showing in additional detail portions of one of the blocks shown in FIG. 1A, this block being designated as "Media Stream Controller" in FIG. 1A.

The peripheral bus 110 shown in FIG. 1A is coupled to a media stream controller 114 shown as a single block in FIG. 1A and as a simplified block diagram in FIG. 2. The media stream controller 114 may be disposed on an integrated circuit chip.

Referring to FIG. 1A, the media stream controller 114 receives inputs from a video input controller 118. The video input controller 118 receives video inputs through a bus 120 from a video source 122 which may be constructed in a conventional manner. The media stream controller 114 also receives inputs from, and provides outputs to, an audio I/O controller 124 which may be constructed in a conventional manner. The audio I/O controller 124 may provide sound output to speakers or some other sound output device (not shown) or receive inputs from a speaker or other sound input device (not shown). Preferably, a standard AES/EBU serial audio interface is used for communication between the media stream controller 114 and audio I/O controller 124. The audio subsystem and related portions of system 100 are described in further detail in co-pending application Ser. No. 08/337.921 filed on Nov. 10, 1994 in the names of Paul B. Wood and Marc M. Stimak as joint inventors, titled "System and Method for Command Processing and Data Transfer in a Computer System for Sound or the Like", assigned of record to the assignee of record of this application, and which is hereby incorporated herein by reference.

A random bus 126 is common with the media stream controller 114 and a display memory 128. Preferably, random bus 126 allows for a high rate of data transfer between the media stream controller 114 and the display memory 128. In the first embodiment, random bus 126 supports a data transfer rate of approximately 100 megabits/second (100 Mbs) and includes a thirty two (32) bit wide data bus.

The display memory 128 has different portions for storing data and control information related to various media subsystems. For example, the display memory 128 has a portion 130 designated as a "GUI FIFO memory " for storing commands on an overflow basis. The GUI FIFO memory portion 130 and related portions of the system are disclosed in detail in co-pending application Ser. No. 08/337.939 filed on Nov. 10, 1994 in the names of David C. Baker and Michael D. Asal as joint inventors, titled "System for, and Method of, Processing in Hardware Commands Received from Software without Polling of the Hardware by the Software", assigned of record to the assignee of record of this application, and which is hereby incorporated herein by reference. The display memory 128 also has an audio memory portion 132 for storing information related to digital sound I/O. The audio memory 132 is described in further detail in co-pending application Ser. No. 08/337.924 filed on Nov. 10, 1994 in the names of Paul B. Wood and Marc M. Stimak as joint inventors, assigned of record to the assignee of record of this application, titled "System and Method for Command Processing and Data Transfer in a Computer System for Sound or the Like", and which is hereby incorporated herein by reference. The display memory 128 also includes a graphics frame buffer memory 134 for storing graphics data, such as data for a look-up table, and a video output memory 136 for storing digital composite video data. A video input memory portion (not shown) may also be provided. A system for storing graphics data and video data in different portions of a display memory is disclosed in detail and claimed in U.S. Pat. No. 5.406.305.

It will be recognized that not all portions of the display memory 128 need be active or resident at the same time. For instance, in the first embodiment video input and composite video output will not both be active at the same time due to memory and bandwidth constraints. In fact, the first embodiment generally only provides memory and graphics refresh while converting and outputting composite video signals. However, memory and bandwidth may be increased in alternative embodiments to allow additional media subsystems to function concurrently.

The embodiments shown in FIGS. 1A and 1B include a display memory 128 using video random access memory (VRAM). Using video random access memory for display memory 128 has certain advantages because it operates at a relatively high serial output clock speed and because it includes a serial output register for shifting out digital data taken from different positions in the display memory. However, as will be readily apparent to those of ordinary skill in the art, other types of memories can be used without departing from the scope of the present invention. These include, without limitation, a high speed dynamic random access memory (DRAM) such as illustrated in FIG. 1C and a synchronous dynamic random access memory (SDRAM).

The outputs from the graphics frame buffer memory 134 and the video output memory 136 may be provided on a line 138 designated as "Display Data to PACDAC". The output on the line 138 is provided to PACDAC 140 and may include both data and control information from display memory 128. The term "PACDAC" refers to a packet based digital-to-analog converter (DAC). A PACDAC and related portions of the system are described in detail and claimed in co-pending application Ser. No. 08/214.787 filed Mar. 16, 1994 , in the names of David C. Baker and Jonathan I. Siann, titled "Multimedia Graphics System", assigned of record to the assignee of record of this application, and which is hereby incorporated herein by reference. The PACDAC uses a first-in/first-out buffer (FIFO) to buffer video, graphics or control related packets received from display memory 128. The video or graphics related packets may be converted to analog form and output to a video or graphics device. Preferably line 138 allows for a high rate of data transfer between display memory 128 and PACDAC 140. In the first embodiment, line 138 supports a data transfer rate of approximately two hundred megabits/second (200 Mbs) and includes a thirty two (32) bit wide data bus.

In addition to receiving data and control information across line 138, PACDAC 140 receives control information from media stream controller 114 across line 160, also designated as "Packet Type" in FIG. 1. This control information indicates the type of packet (video, graphics, control information etc.) that is being sent to the PACDAC 140 at any given time. PACDAC 140 also provides certain information to media stream controller 114. The PACDAC provides a video ready signal (VRDY) to the media stream controller 114 across line 150, also designated as "VRDY" in FIG. 1. The video ready signal indicates to the media stream controller 114 that PACDAC 140 is ready to receive video related data from display memory 128. The PACDAC 140 also provides media stream controller 114 with certain status information across a bus 170, which is preferably a standard $I^2C$ bus.

Clocking information may also be generated in the PACDAC 140 of the first embodiment. In the first embodiment, clock signals having frequencies of approximately 16.9344 Megahertz (MHz) and 24.576 MHz are generated. These clock signals may be provided to the media stream controller 114 across line 172. The 24.576 MHz clock signal may be divided in half by media stream controller 114 to produce a 12.288 MHz clock signal. This provides a 12.288 MHz clock signal in addition to the 16.9344 MHz clock signal. Both the 12.288 MHz and 16.9344 MHz clock signals are used for audio processing in the first embodiment. The 24.576 MHz clock signal nay also be doubled (to almost 50 MHz) or quadrupled (to almost 100 MHz) to provide for high speed clocking inside the media stream controller 114. The 16.9344 MHz and 24.576 MHz clock signals are also used in PACDAC 140 to control video and graphics processing.

The PACDAC 140 of the first embodiment uses a FIFO and DAC to generate an analog composite video signal from data stored in the display memory 128. The composite video signal of the first embodiment may be provided to a video device, such as a VCR, NTSC/PAL monitor, or the like, through the NTSCIPA.L port 142. In addition, the PACDAC may have a random access memory (RAM) and additional digital-to-analog converters for graphics. For graphics, the binary information in the graphics frame buffer memory 134 may represent positions in a RAM look-up table and these positions may have binary indications representing pseudo colors. These binary indications are converted to analog values by digital-to-analog converters to provide the colors at the different pixel positions on the graphics display monitor through ports 144 labelled RGB. As disclosed in U.S. Pat. No. 5,406,306, video information from a video input memory (not shown) may also be converted to a form compatible with the graphics information for the graphics frame buffer memory 134 and this converted video information may be shown in a display monitor through ports 144.

The primary coordination among the various media components of the first embodiment is provided by media stream controller 114. Portions of media stream controller 114 are shown in additional detail in FIG. 2. Referring to FIG. 2, the media stream controller 114 communicates with the peripheral bus 110 through a main bus interface 200. The main bus interface 200 is connected to an internal 3-state Hbus 202 allowing communication with various functional modules attached to the Hbus. These modules may include, among other things, a video input interface 203 for receiving video data, a VGA controller 204 for graphics, an audio module 206 for sound, an NTSC/PAL video out module 207 for outputting video data, a memory refresh module 208 for controlling the refresh or the display memory 128, and a media buffer access controller 209 which may allow data to pass through the media stream controller to the display memory via an Mbus 210 and media buffer memory controller 212. A GUI accelerator 214 may also be provided as shown. Other modules such as flash ROM or Yamaha OPL support may also be added to the Hbus.

Each of these modules is connected to an internal Mbus 210 which provides communication with media buffer memory controller 212. The media buffer memory controller 212 is a memory controller for display memory 128, and communicates with the display memory across random bus 126. Each of the modules may transfer packets of data to and/or from the display memory via Mbus 210, media buffer memory controller 212, and random bus 126.

A PACDAC controller 218 is also provided in the media stream controller 114. The PACDAC controller provides control information to PACDAC 140. The PACDAC controller 218 is connected to Mbus 210 and may transfer packets of PACDAC control data to media buffer memory controller 212 over Mbus 210. In addition, the PACDAC controller 218 may send other PACDAC control information to media buffer access controller 212 across line 224. Control information for the PACDAC may then be sent through the display memory 128 to the PACDAC 140. The PACDAC controller 218 also provides signals to PACDAC 140 on line 160, also designated as "Packet Type" in FIG. 1, which indicate whether a packet received by the PACDAC 140 from the display memory 128 contains control information or video or graphics related information.

The VGA controller 204, NTSC!PAL video out 207, PACDAC controller 218, and an $I^2C$ controller 220 are connected to, and may communicate across bus 222. The media stream controller 114 may communicate with other portions of the multimedia system of the first embodiment through the video input interface 203, audio module 206, media buffer memory controller 212, PACDAC controller 218, and $I^2C$ interface 220. Preferably, standard interfaces such as AES/EBU and $I^2C$ are supported.

In addition, the NTSC/PAL video out module 207 may receive a video ready signal from PACDAC 140 over VRDY line 150. A signal on VRDY line 150 indicates that the PACDAC 140 is ready to receive packet(s) of digital composite video data which are converted by the PACDAC 140 to produce an analog composite video signal. When the NTSC/PAL video out module receives a video ready signal, it sends a request to the media buffer memory controller 212 over Mbus 210. The media buffer memory controller 212 then causes the requested packet of digital composite video data to be transferred to the PACDAC from display memory 128. Once the request from the NTSC/PAL video out module 207 has been serviced, the media buffer memory controller sends an acknowledgement signal to the NTSC/PAL video out module 207 over line 226. The NTSC/PAL video out module 207 will not send additional video related packets in response to a video ready signal until the acknowledgement signal has been received. This allows the PACDAC 140 to receive the first packet and to deassert the video ready signal if necessary to prevent additional packets from being sent by the NTSC/PAL video out module 207.

It will be apparent to those of ordinary skill in the art that the system described above provides an architecture that allows hardware components—including without limitation the main bus interface 200, display memory 128, and PACDAC 140—to be shared by multiple media subsystems. It should be noted that, traditionally, graphics, video, and audio subsystems have used separate memory spaces and bus connections as a result of independent controllers with incompatible data types. This may result in wasted memory space and memory bandwidth, duplicated bus interface logic, and wasted CPU cycles to manage independent subsystems. As a consequence, the cost of providing these capabilities has been relatively high. It is an advantage of the system of the first embodiment that components may be shared and that the cost and complexity of the overall multimedia solution is reduced.

Providing composite video output from the system of the first embodiment, however, poses additional challenges. Generating a composite video signal conventionally requires complex circuitry and consumes high bandwidth. In the system of the first embodiment, however, a video output system is preferably provided using primarily shared hardware components. In addition, the first embodiment provides a flexible architecture allowing different video formats to be supported with the same hardware. Much of the specialized processing is moved to software which allows simpler and more generalized hardware to be used. In addition, a unique preprocessing system allows repetitive video related data, such as video control information, to be generated in advance in a compressed format and reused with different active video. This eliminates the complex circuitry conventionally required to generate these signals on the fly while also reducing memory and bandwidth requirements.

OVERVIEW OF OPERATION

Figure 3:
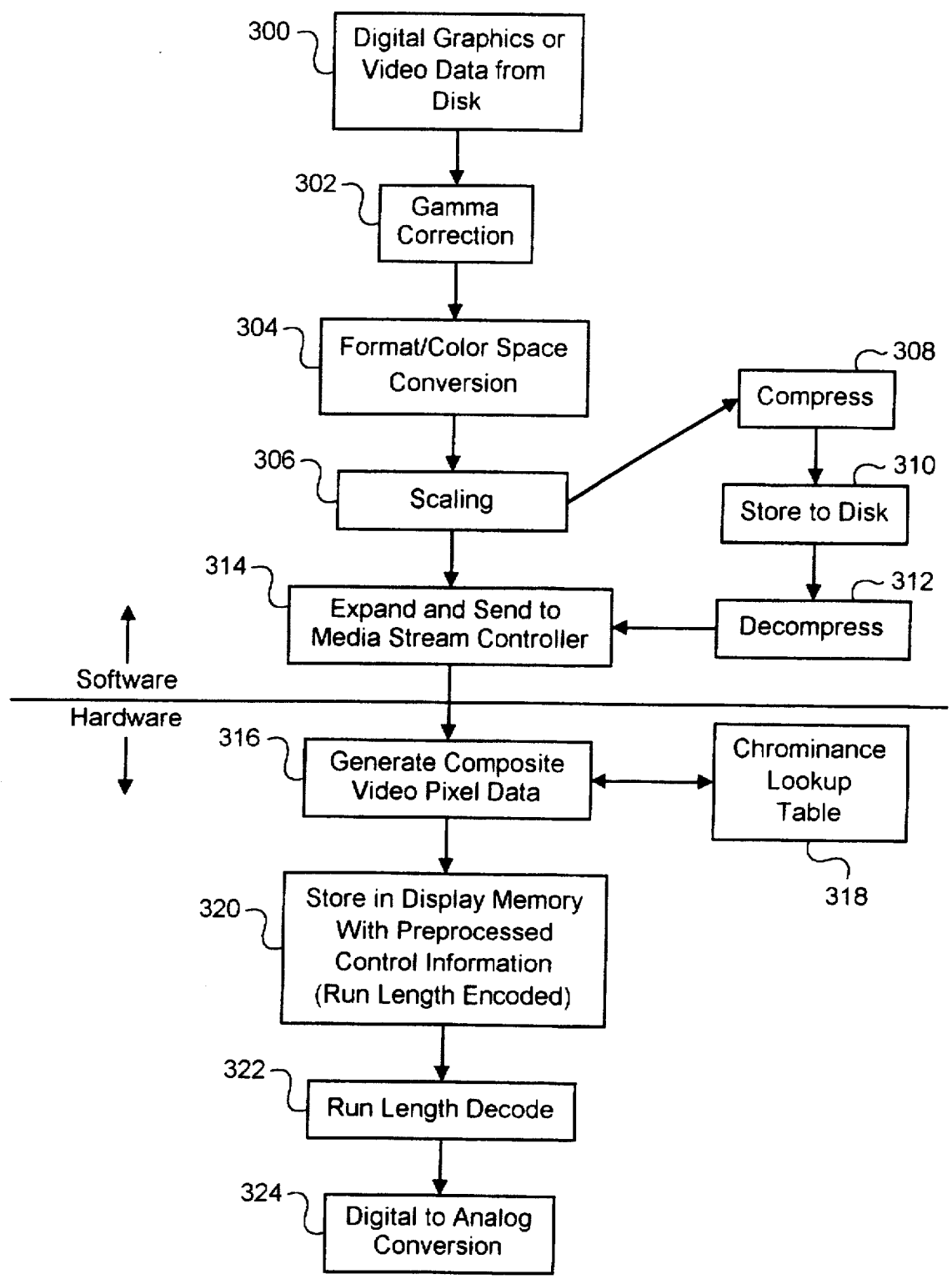
FIG. 3 is a flow chart illustrating a process for generating a composite video signal in a system according to the first embodiment of the present invention.

FIG. 3 is a flow chart that illustrates the overall process of generating a composite video signal in the system of the first embodiment. For the first embodiment, it is assumed that the desired digital graphics or video pixel data is stored on a disk as shown in stage 300 of FIG. 3. The data may, for instance, be in a standard ".AVI" file format as is known in the art. Of course, other sources or formats of data may readily be supported as well.

This digital pixel data is initially processed by a software application program being executed by CPU 102. The application program may load the digital pixel data from peripheral equipment 116, such as a disk drive, into main memory 104 as necessary for processing. The processing required by the application will, of course, depend upon the format of the initial digital pixel data. Typical processing steps that may be required are illustrated in FIG. 3. However, it will be readily understood that by using software for the initial processing, great flexibility can be built into the system to support different input formats and different processing steps. For more information on video formats and processing see Keith Jack, *Video Demystified, A Handbook for the Digital Engineer*, (HighText 1993) (hereinafter "*Video Demystified*") which is hereby specifically incorporated herein by reference in its entirety.

For illustrative purposes, it will be assumed that the initial data input file contains digital graphics pixel data in red, green, and blue (RGB) color space format. The RGB color space is widely used for computer graphics and imaging. In typical RGB graphics systems each pixel on the display is assigned different levels of red, green and blue which are combined to determine the color of the pixel. For more information on the RGB color space and graphics systems, see *Video Demystified* at 27–196 which is incorporated herein by reference. While the initial digital data may represent another color space or format, techniques similar to those used for RGB pixel data may be applied as will be readily apparent to those of ordinary skill in the art.

In order to produce a composite video signal, the RGB pixel data is converted to a video or broadcast format. Video and broadcast formats typically use luminance and chrominance components. The luminance component (referred to as "Y") represents intensity information. The chrominance components (referred to as "U" and "V") determine the color to be displayed. This YUV color space is the basic color space used in a variety of video standards including PAL, NTSC, and SECAM. Other related color spaces, such as YIQ, YDrDb, or YCrCb, may also be used. Conversion between these formats is well known in the art. See *Video Demystified* at 28–54 which is incorporated herein by reference. Of course, if the input digital data is already in the desired format, no color space conversion will be necessary.

The first step 302 of the conversion performed by the application software of the first embodiment is gamma correction. Gamma correction adjusts linear RGB pixel data to account for nonlinear characteristics of displays using phosphors (as well as some cameras). The gamma-corrected RGB pixel data is then converted to the YUV color space as shown at step 304 of FIG. 3. Of course, conversion to other formats (such as YIQ) may readily be supported within the scope of the present invention. These gamma and color space conversions are well known in the art. See *Video Demystified* at 109–110 which is incorporated herein by reference. Other format conversion necessary to produce appropriate YUV component pixel data is also performed at step 304 by the application software of the first embodiment using techniques known in the art. This processing may include, for instance, composite luminance generation. See *Video Demystified* at 111 which is incorporated herein by reference.

As shown at step 306, the software of the first embodiment then scales the converted YUV component pixel data as appropriate to generate QCIF resolution. In QCIF format each pixel in the data represents sixteen physical pixels when displayed at full resolution. QCIF format is presently preferred since it reduces the bandwidth and storage requirements of the first embodiment. Of course, other scaling such as CIF (Common Interchange Format) scaling may be supported within the scope of the present invention. For a description of the relationship between full resolution, CIF, and QCIF for different video signals see *Video Demystified* at 15 which is incorporated herein by reference. The bandwidth requirements in the first embodiment are further decreased by subsampling the unmodulated chrominance components (U and V) by a factor of four. Thus, four luminance components (Y) share a single pair of unmodulated chrominance components (U and V). At QCIF resolution, each pair of unmodulated chrominance components (U and V), therefore, represents sixty four (64) pixels when displayed at full resolution. Preferably, in performing this subsampling the data is ordered such that a single pair of unmodulated chrominance components (U and V) is followed by four luminance components (Y), since this is the order expected by the media stream controller 114 of the first embodiment.

At this point, the converted pixel data may be compressed at 308 and stored to disk at 310 for future processing. The conversion of pixel data formats is thereby decoupled from the real time composite video output. The pixel data may later be decompressed at 312 for further processing. Alternatively, if sufficient processing power and bandwidth are provided, the software application may convert and transfer the pixel data in real time as indicated by the arrow from step 306 to step 314 in FIG. 3.

At step 314 the software application of the first embodiment sends the converted digital video pixel data to the media stream controller 114 for further processing. The software application sends a line of video pixel data four times to account for the vertical QCIF compression. Expansion in the horizontal direction is accomplished by the media stream controller 114 in the first embodiment as will be described further below.

While the software preprocessing of the first embodiment uses several techniques known in the art, combining these techniques in software, as described above, allows greatly simplified video processing by the hardware. In addition, the software provides flexibility by allowing different data formats and scaling to be supported in the first embodiment without changing the hardware.

For the first embodiment, the converted digital video pixel data is sent to the media stream controller 114 by the application software executing on CPU 102. As shown at Step 316 of FIG. 3, the media stream controller 114 then generates digital composite pixel data which is stored in display memory 128. The digital composite pixel data represents a pulse code modulated (PCM) digital value for a pixel in the composite video signal. Each luminance component (Y) is expanded for four pixels horizontally to account for the QCIF compression, and each pair of chrominance components (U and V) is expanded sixteen times to account for the QCIF compression and the four times subsampling of the chrominance components. As is known in the art, to form a composite video signal for each video pixel the unmodulated chrominance components (U and V) are modulated according to the frequency of a subcarrier signal and added together to form a composite chrominance. See *Video Demystified* at 55–105 and 118–124 which is incorporated herein by reference. The composite chrominance is then added to the luminance component (Y) to form digital composite pixel data. Table 1 shows equations for calculating composite NTSC and PAL video signals where $\omega$ equals $2\pi$ times the frequency of the subcarrier signal, $F_{sc}$. The frequency of the subcarrier signal for different video standards is well known in the art.

TABLE 1

(1) composite NTSC with YIQ color space =
   $Y + Q\sin(\omega t + 33°) + I\cos(\omega t + 33°)$
(2) composite NTSC with YUV color space = $Y + U\sin\omega t + V\cos\omega t$
(3) composite PAL with YUV color space = $Y + U\sin\omega t \pm V\cos\omega t$ As is known in the art, the sign of V for composite PAL alternates from one line to the next (known as the PAL Switch). In conventional systems, complex hardware including multipliers or filters may be required to calculate modulated chrominance. However, in the system of the first embodiment this calculation is simplified by using a chrominance look-up table 318 that is stored in the video output memory portion 136 of the display memory 128. In the first embodiment, the chrominance look-up table 318 is pre-calculated and pre-loaded into the display memory before video output processing begins. This may be accomplished by the application software at initialization. The chrominance look-up table 318 contains modulated values of the (J and V (or Q and I) chrominance components for consecutive discrete values of $F_{sc}$ as determined by the pixel sample rate. Preferably, the pixel sample rate is at least two times $F_{sc}$. In the first embodiment, the pixel sample rate is either 12.288 MH$_z$ or 16.9344 MH$_z$, which allows the same clock signals to be used by both the NTSC/PAL video out module 207 and the audio subsystem. As described below, however, certain processing may be simplified in an alternative embodiment by using a pixel sample rate that is four times $F_{sc}$. In the first embodiment, the chrominance look-up table 318 may contain all of the discrete values for U sin $\omega t$ and V cos $\omega t$ for NTSC and/or PAL format. Of course other color spaces (such as YIQ) and other video formats may be supported. It is an advantage of this system that the hardware is simplified, and that different video formats may be supported simply by loading different values into the chrominance look-up table 318. Although the chrominance look-up table 318 may be relatively large, no special memory is required since the display memory 128 has already been provided for graphics and for other uses. By sharing the display memory 128, the cost of separate buffers for audio, graphics, and video is eliminated.

In the first embodiment, composite video pixel data is generated by simply using table look-up to get the modulated chrominance components and then adding these values to the luminance component. As shown at step 320 of FIG. 3, the composite pixel data is then stored in the video output memory portion 136 of the display memory 128. The composite pixel data is stored in fields in the order that the pixels will be output. Horizontal video control information that must be output at the end of each line of active video is preloaded into the display memory 128 to coincide with the end of each line of composite pixel data. Vertical video control information that must be output at the end of each field is also preloaded into the display memory. Preferably, the horizontal and vertical video control information is run length encoded (RLE) to reduce the memory required for storage and to reduce bandwidth required in the system. The preloading may occur upon initialization of the software application. In effect, this forms a template in the display memory 128 for the video data with video control information already preset. All that remains is for the composite pixel data to be loaded into the appropriate pixel positions in the display memory 128.

It is an advantage of this system over conventional systems that complex hardware is not required to generate blanking and synchronization signals. This information is precalculated and loaded into the display memory 128. In addition, bandwidth is not consumed between the CPU 102, the main memory 104 and the display memory 128 since the information is preloaded before processing begins. Finally, bandwidth between the display memory 128 and the PAC-DAC 140 is conserved since run length encoding (RLE) is used.

After storing the composite pixel data in the display memory 128 in the first embodiment, the digital composite video data (including video control information) is read out of the display memory 128 and provided to PACDAC 140. As shown at step 322 in FIG. 3, the PACDAC then run length decodes the information as necessary. Data that is not run length encoded, such as the PCM composite pixel data, is passed through unmodified. The run length decoded data is then converted to analog form by the PACDAC's digital-to-analog converter as shown at step 324. For the first embodiment, NTSC or PAL composite video signals may be provided to a standard video output or processing device.

It will be apparent to those of ordinary skill in the art that the process and architecture of the first embodiment allows many format related considerations to be decoupled from the hardware design. The software processing (color space conversion, gamma correction, etc.), the modulated chrominance components in the chrominance look-up table 318, and the video control information may be determined independently of the hardware. This provides both flexibility as well as simplified system design.

Specific Operation

Several aspects of the first embodiment—including the generation of composite pixel data, the storage of video data in the display memory 128, and the decoding and conversion performed by the PACDAC 140—will now be described in further detail.

Figure 4:
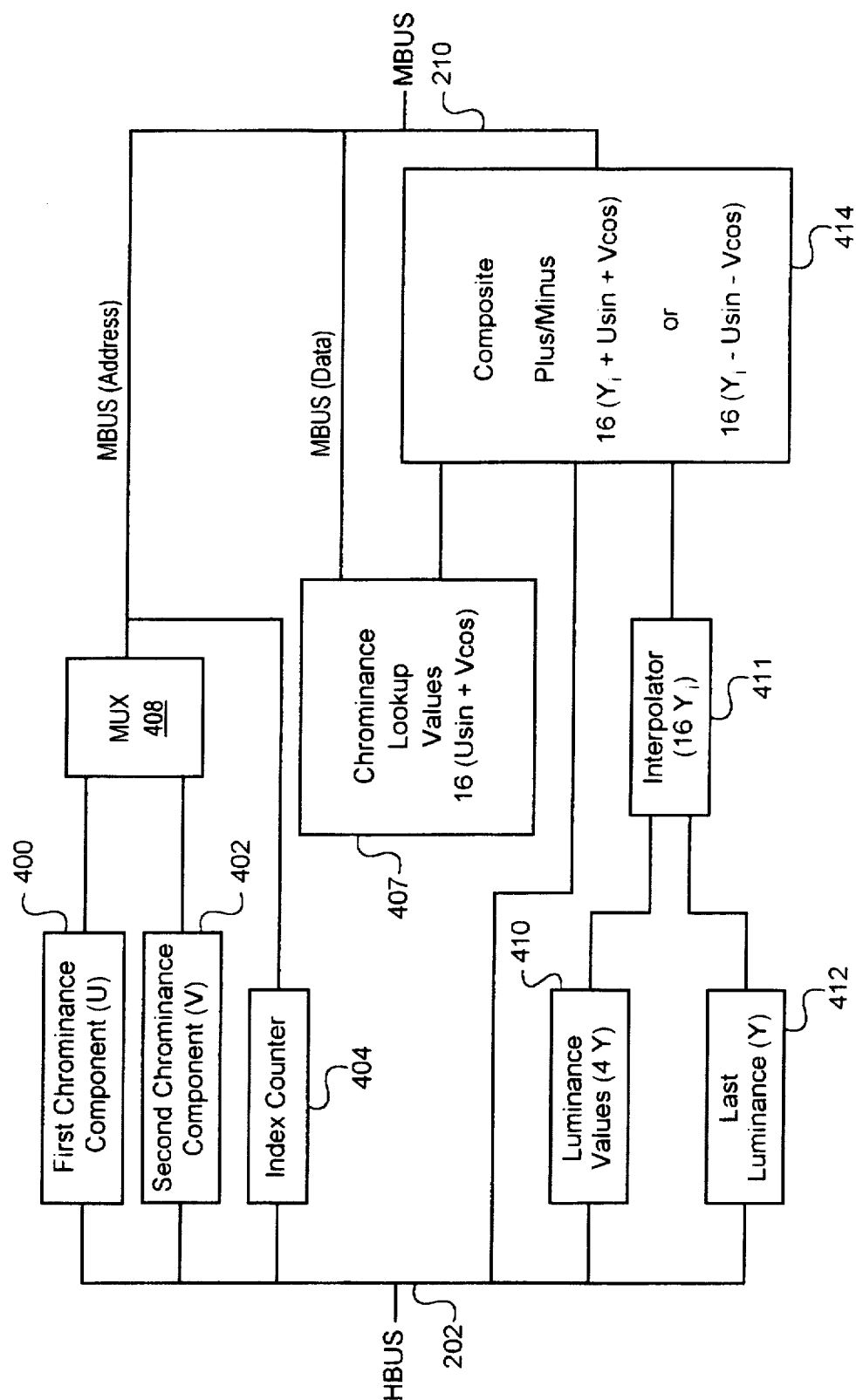
FIG. 4 is a block diagram showing in additional detail portions of one of the blocks shown in FIG. 2, this block being designated as "NTSC/PAL Video Out" in FIG. 2.

FIG. 4 illustrates in additional detail portions of the NTSC/PAL video out module 207 and media stream controller 114 used for generating composite pixel data in the first embodiment. In the NTSC/PAL video out module, registers 400 and 402 are provided for storing a first chrominance component (U) and a second chrominance component (V) respectively. While these registers 400 and 402 have been designated U and V respectively, other chrominance components for other video formats or color spaces may be used as well. An index counter 404 is also provided for storing and incrementing an index value. The index value is used to look up values in the chrominance look-up table in display memory 128. The chrominance components and the index are combined to provide an offset into the chrominance look-up table 318. Each index corresponds to a discrete value of t used to calculate modulated chrominance according to the equations shown in Table 1. Consecutive values of the index are used in the first embodiment to address subtables that contain the modulated chrominance components for sixteen (16) consecutive values of t. Incrementing the index skips to the next subtable which has entries for the next sixteen (16) consecutive values of t. An initial index is loaded into the index counter by the application hardware at the start of each line of video data.

The registers 400 and 402 and the index counter 404 are coupled to the Hbus 202 so that they may receive input values from the software application and are coupled to the Mbus 210 so that they may be used to look up modulated chrominance components. The modulated chrominance components returned from the table look-up are stored in register 407. Since the chrominance components (U and V) are subsampled by a factor of four and QCIF format accounts for another four times compression, each table look-up actually returns sixteen values so full resolution video may be produced.

Figure 5:
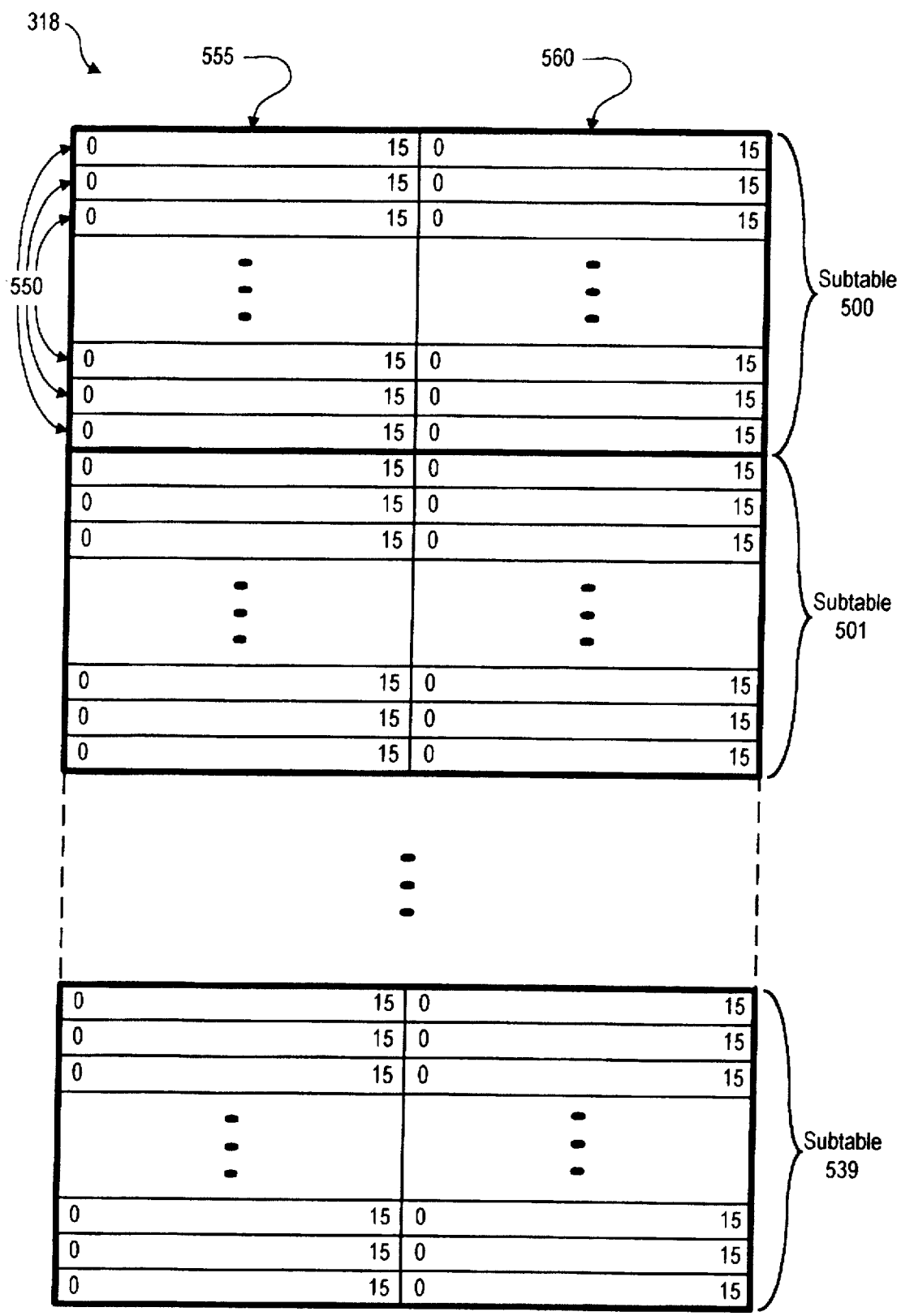
FIG. 5 is a simplified block diagram illustrating the structure of a chrominance look-up table according to the first embodiment.

FIG. 5 illustrates the structure of an exemplary chrominance look-up table 318 according to the first embodiment. The chrominance look-up table 318 is provided in the video output memory portion 136 of display memory 128. FIG. 5 illustrates an exemplary NTSC chrominance look-up table providing entries for a pixel sample rate of 12.288 MHz. The chrominance look-up table 318 contains premultiplied values of U sin ωt and V cos ωt for a line of NTSC active video. At a pixel sample rate of 12.288 MHz, for example, there are 640 discrete values of t for a line of NTSC active video in the first embodiment. In addition, in the first embodiment there are 256 possible values for U and V (ranging from −128 to 127). Thus, there are 163,840 (640×256) entries for modulated U chrominance components and 163,840 entries for modulated V chrominance components. These 327,680 entries are arranged into 40 subtables 500–539. Each subtable 500–539 contains two hundred and fifty six rows 550, one for each possible value of U and V. Each row contains sixteen values of U sin ωt in a first column 555 followed by sixteen values of V cos ωt in a second column 560, all for the given value of U and V as determined by the row. In FIG. 5, the leftmost entry for U sin ωt in each row 550 is designated as entry "0" and the rightmost entry is designated as entry "15". Similarly, the leftmost entry for V cos ωt (in column 560) is designated as entry "0" and the rightmost entry is designated as entry "15". The entries in each row represent modulated chrominance components for sixteen (16) consecutive discrete values of t, where t is the sample number divided by 12.288 MHz. For purposes of this calculation, the starting sample number in the exemplary chrominance look-up table is one hundred twenty one (121) which provides for the correct starting phase. The last sample in the table is therefore seven hundred sixty one (761) which is the number of pixels in a line of NTSC active video at a sample rate of 12.288 MHz (640) plus the starting sample number (121).

To look up values in the chrominance look-up table 318, the index from index counter 404 and the first and second chrominance components from registers 400 and 402 are provided to the address lines of the Mbus 210 as shown in FIG. 4. The index is provided to the upper address lines and is used to select a specific subtable 500–539 of the chrominance look-up table 318. For the look-up for the first chrominance component (U), the output from register 402 is selected by multiplexer (MUX) 408 and sent to lower address lines of the Mbus to select a specific row of the subtable 500–539. Thus, a single index and first chrominance component (U) are used to provide an offset to a row of sixteen consecutive modulated chrominance components (U sin ωt). These values may be provided on the data lines of the Mbus and loaded into registers 407. Thus, a single value for the first chrominance component (U) looks up sixteen modulated chrominance components (16 U sin ωt) which accounts for the four times subsampling of U and the QCIF compression.

To provide the table look-up for the second chrominance component, MUX 408 provides the output from register 404 to the Mbus address lines, and in addition a bit of the Mbus address is set to provide an offset into the second column of the subtable containing V cos ωt values. When the sixteen V cos ωt values are returned, they are added to the sixteen U sin ωt values already loaded in register 407. This is accomplished by passing the modulated chrominance components through composite plus/minus logic 414. This logic may include a double word (Dword) adder/subtractor. With eight (8) bit modulated chrominance components, the addition of the sixteen (16) modulated chrominance components may be accomplished with four cycles through the Dword adder, with the carry between bytes being suppressed. The results are stored in register 407. Thus, after a single look-up, register 407 will contain sixteen (16) values of U sin ωt+V cos ωt, representing composite chrominance for sixteen (16) consecutive video pixel samples. After each look-up, index counter 404 is incremented to point to the next subtable, so the next table look-up will return the next sixteen consecutive modulated chrominance components. Of course, it will be readily understood that, within the scope of the present invention, the structure and entries of the chrominance look-up table may vary depending on the video format, pixel sample rate, and level of compression supported. For instance PAL may be supported by loading a different chrominance look-up table into the display memory 128. For PAL, however, twice as many entries would be provided to account for PAL switching. Rather than storing entries for one line of active video, entries for two lines would be stored. The second set of entries would be used for calculating modulated chrominance for alternating lines of video. These additional entries would provide values where the phase of V is shifted by 180° to account for PAL switching.

Referring to FIG. 4, register 410 is provided for receiving luminance components (Y) from the application software. In the first embodiment, four luminance components (4 Y) are provided at once. To account for QCIF compression, an interpolator 411 interpolates the four luminance components (4 Y) to produce sixteen interpolated luminance components (16 $Y_i$) which correspond to the sixteen (16) modulated chrominance components returned from table look-up and stored in register 407. The interpolator 411 uses a simple add and shift mechanism to interpolate multiple values from the initial four luminance components. The last luminance component used for the previous set of data is stored in register 412, so it may be used to interpolate values between it and the next luminance component provided in register 410. At the beginning of each new line of video data, an initial luminance component is provided by the software to register 412 to be used for initial interpolation. The registers 410 and 412 may be loaded by the software via the Hbus 202.

Once the sixteen modulated chrominance components have been retrieved from the display memory and stored in register 407, and once the interpolator 411 has produced the sixteen interpolated luminance components (16 $Y_i$), the composite plus/minus logic 414 may combine them to produce sixteen composite pixel data samples which are stored in consecutive pixel locations in the display memory 128 as described further below. The operation of the composite plus/minus logic may be controlled by commands from the software application over the Hbus 202. In particular, the software application may send a composite plus command to generate composite pixel data according to Y+U sin+V cos. A composite minus command may be used to generate composite video pixel data for alternating lines. The composite minus command generates composite video pixel data according to Y−U sin−V cos. Alternating composite plus and composite minus commands accounts for a 180° phase shift between adjacent lines in NTSC format. This reduces the number of lines that must be stored in the chrominance look-up table by a factor of two.

Figure 6:
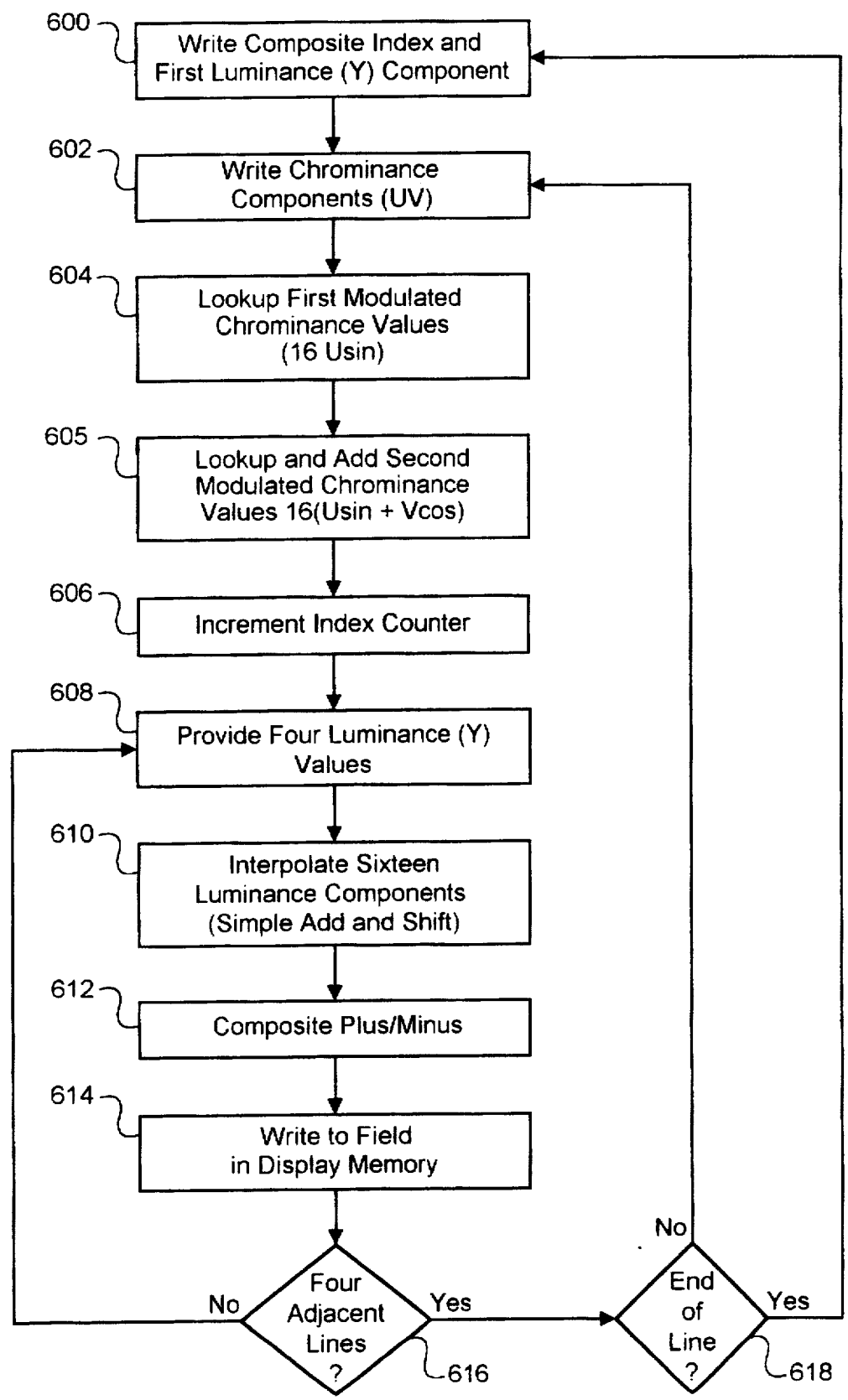
FIG. 6 is a flow chart illustrating a process for generating composite video pixel data according to the first embodiment.

The process of generating composite pixel data in the first embodiment will be described in further detail with reference to FIG. 6. FIG. 6 is a flow chart illustrating the process of producing composite pixel data in the first embodiment. First, as shown at 600, the software application writes a composite index and a first luminance component (Y) to the NTSC/PAL video out module 207 of the media stream controller 114. This command is implemented by a memory mapped write to the display memory 128 with bit flags set indicating that it is a "Write Composite Index and First Y Value" command. The main bus interface 200 intercepts this address from the peripheral bus 110 and sends it to the NTSC/PAL video out module 207 along with data from the data bus portion of the peripheral bus 110. The data includes a composite index value which is loaded as an initial value into the index counter 404 for the current line of video data. The data also includes an initial luminance component (Y) which is loaded into the Last Luminance register 412 for use in interpolation.

As shown at 602, the software application of the first embodiment then writes a pair of U and V chrominance components using a memory mapped I/O command as described above. This command causes unmodulated U and V chrominance components to be loaded from the data bus into registers 400 and 402 respectively. This command also causes modulated chrominance components to be retrieved from the chrominance look-up table 318 in the display memory 128. First, the U chrominance component from register 400 and the index from the index counter 404 are combined to provide an offset into a table of values for the modulated U chrominance component (U sin ωt). Then a state machine counts through and retrieves sixteen consecutive values from the table for the modulated U chrominance components as shown at step 604 in FIG. 6. Each value differs by a discrete incremental change in the value of t used to generate the U sin ωt value, and represents modulated points along the subcarrier wave. These modulated U chrominance components are stored in register 407. As described above, sixteen values are then retrieved for the modulated V chrominance components and added to the modulated U chrominance components stored in register 407 as shown at step 605. At the end of this command cycle, the index counter is incremented as shown at step 606. This increment causes a jump to the next subtable in the chrominance look-up table so that the next U and V values will be properly modulated.

Next, the software application of the first embodiment issues a "composite plus" or "composite minus" memory mapped I/O command. A "composite minus" command is issued for alternating lines of NTSC video data. The data sent along with these commands includes four luminance components which are provided to register 410 as shown at step 608 of FIG. 6. As shown at step 610 of FIG. 6, the interpolator 411 then uses the values from registers 410 and 412 to generate sixteen interpolated luminance components. These sixteen interpolated luminance components are then combined with the sixteen composite chrominance components (U sin ωt+V cos ωt) by composite plus/minus logic 414, as shown at step 612 of FIG. 6. If a "composite plus" command is provided, the respective corresponding interpolated luminance components (Y) and composite chrominance components (U sin ωt+V cos ωt) are added together to form sixteen composite pixels. If a "composite minus" command is provided, the composite chrominance components are subtracted from the luminance components.

As shown at step 614 in FIG. 6, the resulting composite pixel data is written to consecutive locations in the display memory 128. The address from the "composite plus" or "composite minus" command determines the location in the display memory 128 for the composite pixel data. As will be described further below, the composite pixel data is preferably placed in consecutive locations corresponding to consecutive video pixels along a line of a video field. To provide interlacing as described further below, composite video data for even lines may be placed in an even field portion of memory, and odd lines may be placed in an odd field portion of memory. Preferably in the first embodiment, the composite video data (including preloaded horizontal video control information) is ordered such that consecutive locations may be read to provide a field of NTSC or PAL video in the correct sequence.

At step 616 in FIG. 6, the software of the first embodiment determines whether sixteen pixels generated from the same luminance and chrominance components have been placed on four adjacent lines. The same components must be used to generate pixels for four adjacent lines to vertically expand the QCIF data to full video resolution. While the same components are used, it will be understood that the way the components are combined alternates between "composite plus" and "composite minus" to account for the 180° phase shift between adjacent lines. If writes to four lines have not been completed, the application software repeats steps 608 to 614, providing the same luminance components in step 608. It will be readily understood, however, that a different display memory address will be provided so that the resulting composite pixel data will be written to memory locations for a different line of video. If interlacing is provided, consecutive lines will be sent to different fields. Even lines will be sent to an even field and odd lines will be sent to an odd field. In addition, composite plus and composite minus commands will be alternated at step 612 to account for the 180° phase shift between adjacent lines.

After writing composite pixel data for sixteen (16) video pixels on four adjacent lines, the software according to the first embodiment checks to see if a horizontal line of composite pixel data has been completed, as shown at step 618 of FIG. 6. If a horizontal line has not been completed, steps 602–616 are repeated for consecutive UV chrominance components. Once a horizontal line is completed, the software may start a new horizontal line by writing a new index and initial luminance component as shown at step 600. It will be understood that completing a horizontal line of data actually fills in four adjacent lines of composite pixel data in the display memory due to expansion from the original QCIF format. The software of the first embodiment keeps track of addresses for writing composite pixel data into the display memory. When a new horizontal line is started, the software adjusts the addresses to skip over the four adjacent lines just written (as well as preloaded horizontal video control information) so that the next four lines may be filled in. This process continues until a complete screen of composite pixel data has been written into the display memory (which with interlacing includes both an even and odd field).

For PAL video format the software performs a slightly different process. For PAL the chrominance look-up table has twice as many subtables. The extra subtables are used to provide values for alternating lines to account for PAL switching. For PAL, the first look-up returns values where the second modulated chrominance component is V cos ωt. These values are used as described above. However, rather than applying these values to four adjacent lines, they are applied to two alternating lines (for instance lines 1 and 3). The software then causes a second table look-up to be performed in one of the additional subtables which provides a second modulated chrominance component of −V cos ωt. These values are applied to the other two alternating lines (for instance lines 2 and 4).

It should be noted that in the first embodiment, vertical expansion of the data to account for QCIF compression is provided in the software (four adjacent lines are written with the same YUV component pixel data) while the horizontal expansion for luminance components (four Y values are interpolated to produce sixteen) and for subsampled chrominance components (each UV pair is used for sixteen video pixels) is provided in the hardware. Of course, it will be readily apparent that these conversions would not be necessary with full resolution data; however, increased bandwidth would be used on the local and/or peripheral buses 106 and 110. Where compressed data is used, the conversions could also be performed in software, although this would also come at the expense of bandwidth. The system of the first embodiment is advantageous since it conserves bandwidth by performing horizontal expansion in the media stream controller 114 and simplifies the hardware by providing vertical expansion in the software. In addition, by allowing the software to control vertical expansion both NTSC and PAL video formats may be supported with the same hardware. The software simply performs extra table look-ups to account for the PAL switching. Different arithmetic logic hardware is not required.

Figure 7:
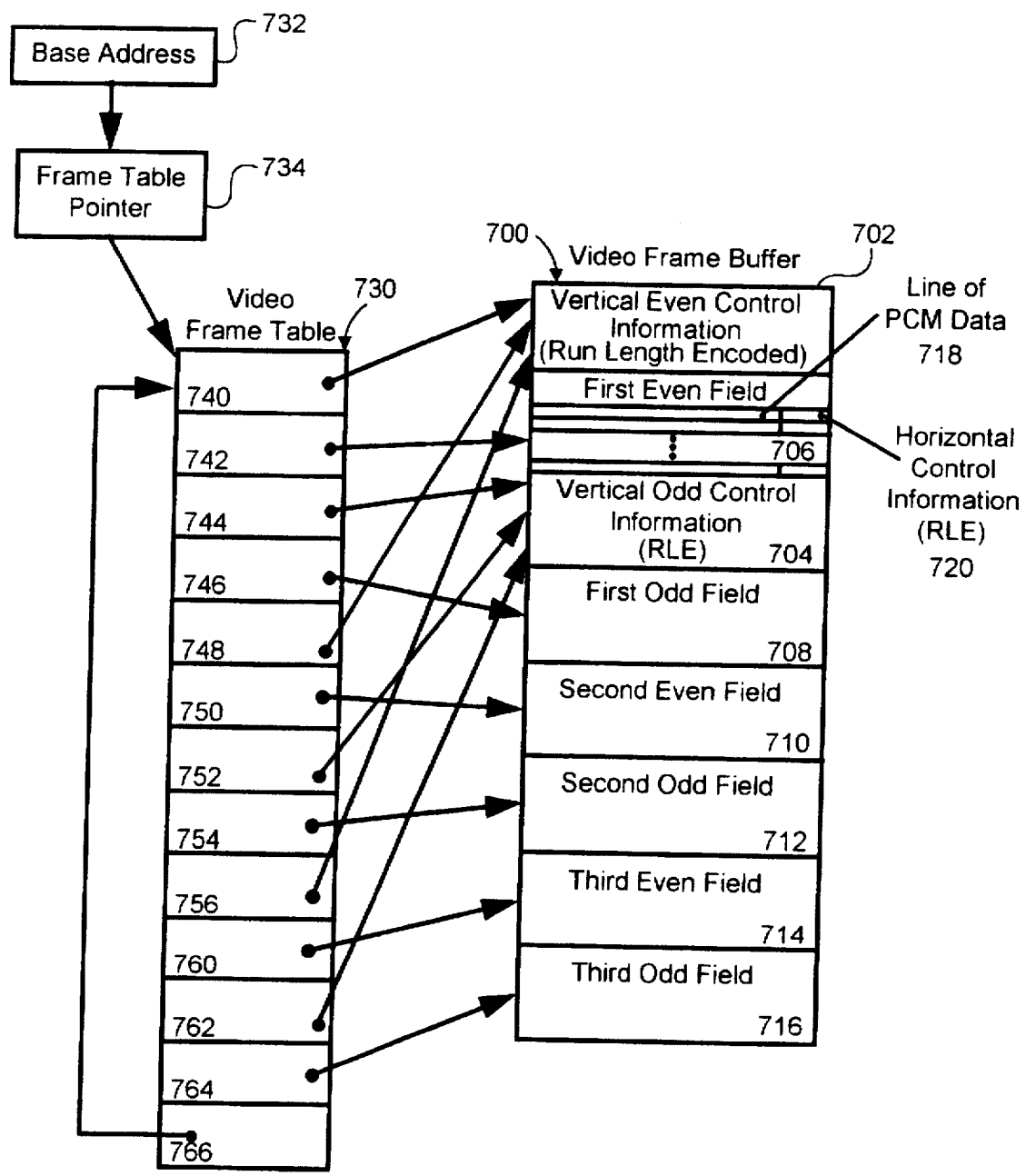
FIG. 7 is a simplified block diagram illustrating the structure of a Video Frame Table and Video Frame Buffer for storing and retrieving digital composite video data according to the first embodiment.

FIG. 7 is a simplified block diagram illustrating the structure of a video frame table and video frame buffer for storing and retrieving digital composite video data according to the first embodiment. The digital composite video data is organized in a frame buffer structure 700 in the display memory 128. The frame buffer 700 is arranged to store video data generally in the order provided for by the NTSC and PAL video formats, although other formats may be supported as well.

In the first embodiment, the application software sets up the frame buffer 700 at initialization time to reflect the desired video format. The application software maintains pointers to the various portions of the frame buffer 700, so they can be accessed by the software during processing. Portions 702 and 704 of the frame buffer 700 are set aside for vertical video control information. This information is output after each field and may include vertical synchronization, blanking, and any other information required by the desired video format. Typically, this information differs for even and odd fields, so separate portions 702 and 704 are set aside for even and odd vertical video control information.

Portions 706–716 are also set aside for the field data. Each field contains lines of PCM composite pixel data 718 provided by the media stream controller 114 during processing as well as horizontal video control information 720 for each line. The horizontal video control information may contain horizontal synchronization, blanking, and any other information required after each line by the video format.

In the first embodiment, three pairs of even and odd fields (706 and 708, 710 and 712, 714 and 716) are provided. This allows data to be placed in one pair of fields while being read out of another. In the first embodiment, this provides a triple buffering system. For instance, the media stream controller 114 may traverse the frame buffer 700 causing consecutive fields of digital composite video data to be output to PAC-DAC 140 across line 138. The first even and odd fields will be output, followed by the second and third even and odd fields. Then the first even and odd fields will be output again and the process repeats itself. While digital composite video data is being output from any given pair of fields, the media stream controller 114 may place new composite pixel data in the other two pairs of fields. This provides seamless transfer of video data and also increases bandwidth by allowing a high rate of data transfer between media stream controller 114 and display memory 128.

Of course, double buffering may also be used, but may require additional coordination between the input and output from the frame buffer. A single buffering system, with one even and one odd field could also be used, but coordination must be provided such that the input to the frame buffer always stays ahead of the output. It will also be readily apparent that for a non-interlaced video format, even and odd fields and even and odd video control information are not required and may be replaced with single vertical control information and field portions of the memory.

In the first embodiment, the vertical and horizontal video control information is determined prior to video output processing. This information is pre-loaded into the frame buffer 700 at initialization. In effect, the frame buffer 700 provides a template for video data where only the composite pixel data needs to be written into the lines of the fields 706–716.

To conserve memory in the first embodiment, the vertical video control information may be shared by multiple fields of a double or triple buffering system. Thus, before data from even fields 706, 710 and 714 is output, the same vertical video control information is output from portion 702. Similarly the odd vertical video control information in portion 704 is shared by odd fields 708, 712, and 716. In the first embodiment, the horizontal video control information is not shared and is provided at the end of each line, since it may be stored in a much smaller area. Of course, in other embodiments, the horizontal video control information could be shared.

To further conserve memory and to reduce the bandwidth consumed between the display memory 128 and the PAC-DAC 140, the vertical and horizontal video control information is stored and transferred in run length encoded (RLE) format. Run length encoding is a method of data compression known in the art. When multiple values are repeated, a code is provided indicating the value and a count of the number of times it is repeated. This is an alternative to storing the value multiple times. Of course, while RLE is presently preferred, other compression methods could be used to conserve memory and bandwidth used by the video control information.

In the first embodiment, a PCM escape bit flag may be sent along with a count to indicate that a certain number of PCM samples will follow without run length encoding. This allows PCM data to be mixed with the RLE data. It should be noted that in the first embodiment, the composite pixel data as well as portions of the video control information are sent as PCM samples without RLE. In the first embodiment, RLE codes are three bytes long while PCM samples are eight bits each. In the unblanked portion of a line, each byte contains a sample that is fed directly to the PACDAC's DAC. At the end of the unblanked period the byte stream is treated as three-byte RLE codes. Each RLE code contains a count field (12 bits), eight bits of running DAC data, and a bit that indicates whether the next byte is the first byte of the next RLE code or the next byte of PCM sample. In essence, the last RLE code before unblanking decodes to the number of subsequent bytes that will be PCM samples and is followed by that number of PCM samples. At the end of that many samples, the decoder assumes that the next byte will be the first byte of an RLE code. The three byte RLE code is described in Table 2.

TABLE 2

| Bit(s) | Field Name | Description |
|---|---|---|
| 23–12 | Run Count<br>($000) Reserved<br>($001) 2 Bytes<br>($002) 3 Bytes<br>($003) 4 Bytes<br>.<br>.<br>.<br>($FFE) 4095 Bytes<br>($FFF) 4096 Bytes | When the PCM Escape field is a logical zero, this field contains the number of sample times for which the value in bits (7–0) is to be sent to the DAC. When the PCM Escape field is a logical one, this field contains the number of 8-bit PCM samples to be passed through to the DAC. The count value must be at least 2 bytes. This field is ignored if bit 9 (Freeze) is a logical one. |
| 11 | Diagnostic Logic Enable | When this bit is a logical zero, diagnostics are suspended. When this bit is a logical |

TABLE 2-continued

| Bit(s) | Field Name | Description |
|---|---|---|
| | (0) Disable<br>(1) Enable | one, diagnostics are enabled. |
| 10 | PCM Escape<br>(0) RLE Word Follows<br>(1) PCM Samples Follows | Escape to PCM samples for the number of bytes specified in the run count field. The current bits for this RLE code will be maintained for the duration of the PCM data which follows. The next RLE code will not be interpreted until after "count" PCM pixel samples have been output to the DAC. This bit is ignored if bit 9 (Freeze) is a logical one. |
| 9 | Freeze<br>(0) Continue<br>(1) Freeze | A logical one in this field causes the logic to end processing. The run count and PCM escape bit are ignored if this bit is a logical one. The run sample byte will be the value that is left stable on the output until the next point at which the logic is again enabled. |
| 8 | Reserved | |
| 7–0 | Run Sample | If PCM Escape is a logical one, this sample is output for the current cycle. If PCM Escape is a logical zero, this sample is repeated for the run count duration. |

Figure 8:
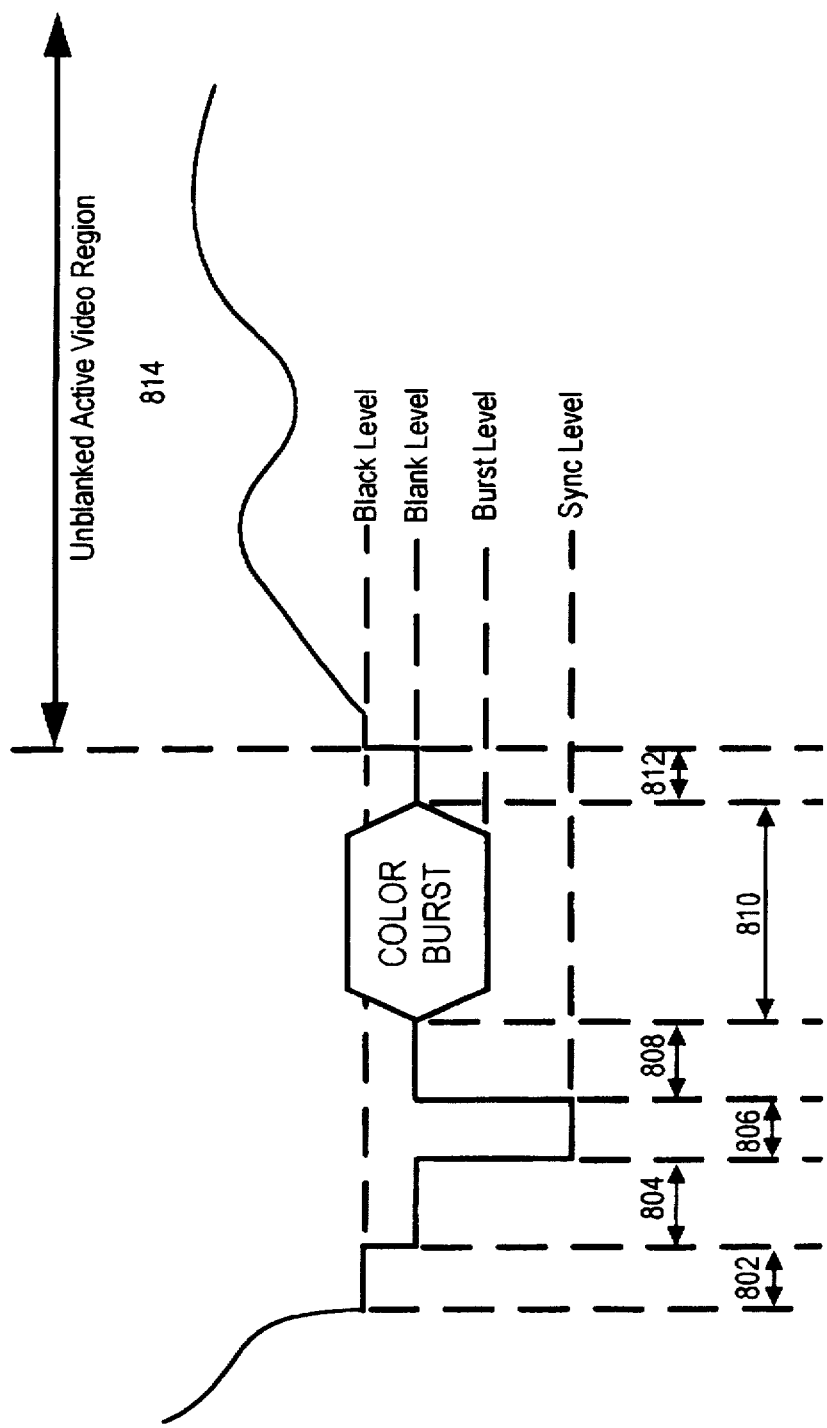
FIG. 8 illustrates video data that may be run length encoded according to an aspect of the first embodiment.

FIG. 8 illustrates horizontal video control information that may be run length encoded according to the first embodiment. For the wave form shown in FIG. 8, notice that the front porch samples are sent as one RLE code while the color burst is sent as a stream of PCM samples, just as the unblanked region is sent as a stream of PCM samples. The actual byte stream would look something like that shown in Table 3, although some modification may be necessary to control the slopes and transition times of certain signals as described further below.

TABLE 3

| Byte Positions | Type/Reference in FIG. 8 | DAC values | Count | Control Bits |
|---|---|---|---|---|
| 0<br>.<br>.<br>.<br>2 | RLE/802 | Black level | Overscan interval | — |
| 3<br>.<br>.<br>.<br>5 | RLE/804 | Blank level | Front porch time | — |
| 6<br>.<br>.<br>.<br>8 | RLE/806 | Sync level | Sync width | — |
| 9<br>.<br>.<br>.<br>11 | RLE/808 | Black level | Back porch before burst | — |
| 12<br>.<br>.<br>.<br>14 | RLE/810 | First sample of burst | $B_n$, the number of PCM samples in burst minus one | PCM Escape |
| 15<br>.<br>.<br>.<br>15 + $B_n$ | PCM/810 | PCM Samples of color burst | — | — |
| 16 + $B_n$ | RLE/812 | Blank level | Overscan | — |

TABLE 3-continued

| Byte Positions | Type/Reference in FIG. 8 | DAC values | Count | Control Bits |
|---|---|---|---|---|
| . . . | | interval | | |
| $18 + B_n$ | | | | |
| $19 + B_n$ | RLE/814 | First sample of scan line | $S_n$, the number of PCM samples in visible portion of scan line minus one | Escape PCM |
| . . . | | | | |
| $21 + B_n$ | | | | |
| $22 + B_n$ | PCM/814 | PCM samples of scan line ($S_n$ bytes) | — | — |
| . . . | | | | |
| $22 + B_n + S_n$ | | | | |

It may be desirable to insert PCM samples into selected portions of the run length encoded video control information to more precisely control the waveform. For instance, video standards often specify the rise and fall times of the sync pulse. The run length encoding in Table 3 may cause the sync transition to occur too quickly and a filter on the video output may be necessary to smooth the video waveform. The amount of filtering may be reduced or eliminated, however, by inserting PCM samples to provide a desired slope for the rise and fall of the sync pulse. In addition, video formats typically control synchronization based upon a transition on the falling edge of the sync pulse. Even if PCM samples are used to form the falling edge of the sync pulse, this transition may occur between two PCM samples. To control the time of transition, it may be desirable to alter the PCM samples on either side of the transition. Thus, to more precisely control the time of transition, the PCM sample on one side of the desired transition point may be set to be slightly above the transition value, and the PCM sample on the other side of the transition point may be set to be slightly below the transition value. Thus, while run length encoding is used to compress the video control information, PCM samples may be inserted as necessary to more precisely control the waveform.

In the first embodiment, the PCM composite pixel data for each active video pixel is provided by the NTSC/PAL video out module 207 as previously described with reference to FIG. 2. The software application provides addresses to the media stream controller 114 and NTSC/PAL video out module 207 indicating where in the frame buffer 700 specific composite pixel data should be written. The composite pixel data is provided over the Mbus 210 and through the media bus controller 212 to the frame buffer 700 in the display memory 128. In particular, even lines of composite pixel data are provided to even fields and odd lines are provided to odd fields. A screen of pixel data is provided to the first even and odd fields 706 and 708. The next screen is provided to the second even and odd fields 710 and 712, and the third screen is provided to the third even and odd fields 714 and 716. Then subsequent screens are cycled through, starting once again with the first even and odd fields 706 and 708. In order to control this process, the application software maintains the addresses of the various portions of the frame buffer 700 in internal variables in main memory 104 or in registers inside CPU 102.

The software of the first embodiment will not overwrite a field until it has been read and sent to PACDAC 140. The digital composite video data (including control information) is read out of the frame buffer 700 using a frame table 730 in the display memory 128 and a base address register 732 and frame table pointer 734 in the media stream controller 114. The base address register 732 contains the starting address of the frame table 730 in the display memory 128, and the frame table pointer register 734 contains an offset to a particular entry 740-766 in the frame table 730. The current entry pointed to by the frame table pointer register 734 indicates which portion of the frame buffer 700 is being output to the PACDAC 140. The base address register 732, frame table pointer register 734 and frame table 730 are accessible to the software through memory mapped I/O. Before writing to a field, the software of the first embodiment checks the frame table pointer register 734 to verify that the field has completed being output to PACDAC 140.

Each entry 740-766 in the frame table 730 of the first embodiment contains an offset to a portion of the frame buffer 700 and a count value indicating the number of data samples in that portion. The NTSC/PAL video out module 207 contains logic that traverses the frame table 730 to output digital composite video data (including control information) to the PACDAC 140. After the number of data values equal to the count of a frame table entry are output, the frame table pointer 734 is incremented to the next entry in the frame table 730. A value of zero for the count in a frame table entry 766 signifies the end of the frame table 730. When the NTSC/PAL video out module 207 gets to this entry in the frame table it ignores the offset/pointer part of the entry, goes back to the start of the frame table and begins processing from there again.

To provide coordination among the input and output of video data through the frame buffer 700, the software may write a value to the NTSC/PAL video out module 207 to pause the video output. The frame table pointer register will not be incremented until the software re-enables the NTSC/PAL video out module 207.

By traversing the frame table 730, the NTSC/PAL video out module 207 is able to output data in the desired video format while sharing vertical video control information. Also, this provides for a multi-buffered system allowing composite pixel data to be simultaneously written in one set of fields while being read out of another set of fields. In addition, this allows the output hardware in the NTSC/PAL video out module 207 to be relatively simple. It only needs to calculate an address from the frame table 730 and output the desired count of data samples from that portion of the frame buffer 700 at the pixel sample rate (which in the first embodiment is either 12.288 MHz or 16.944 MHz which allows the clock to be shared with the audio subsystem). In the first embodiment, the video data is output to PACDAC 140 at approximately 200 Mbs over line 138.

Figure 9A:
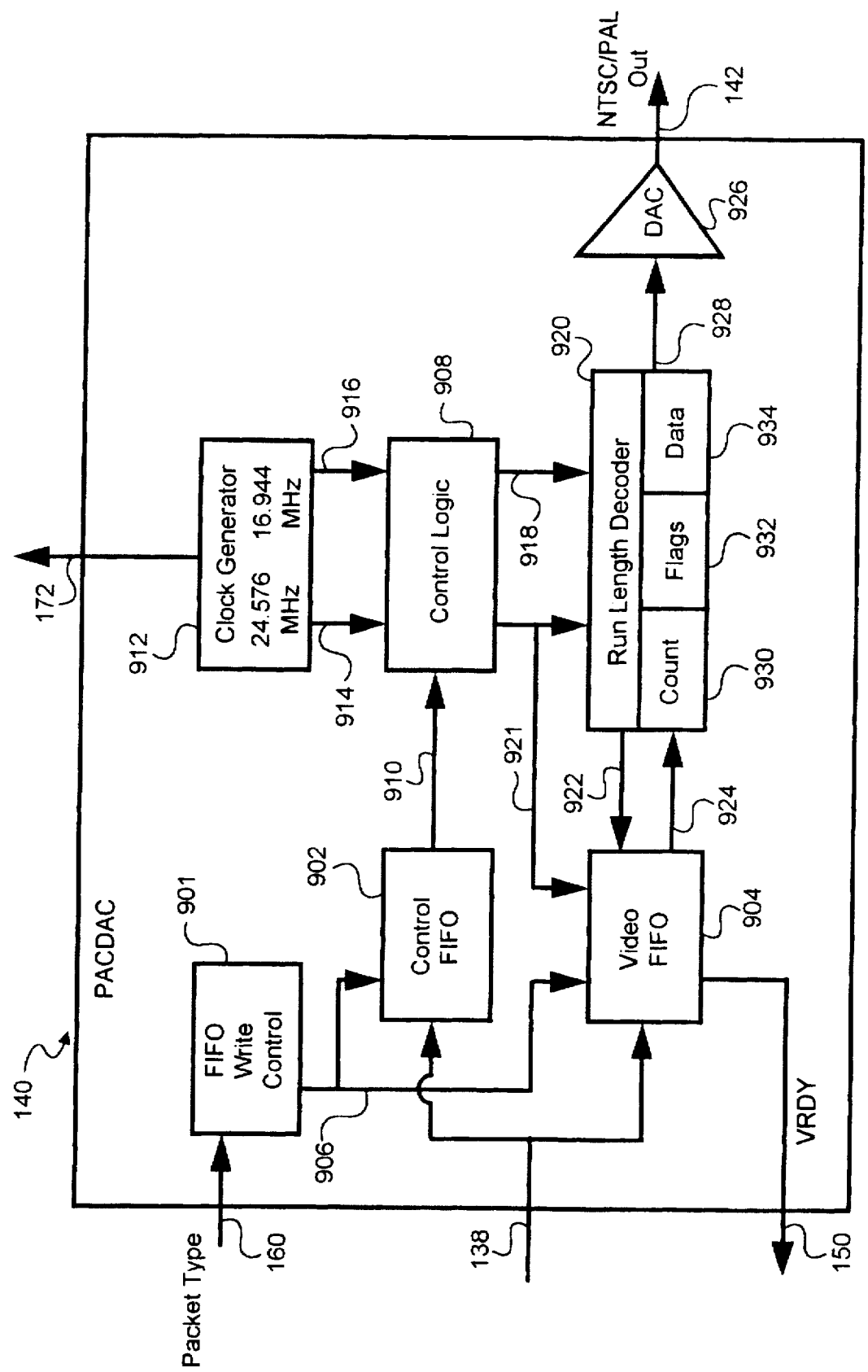
FIG. 9A is a block diagram showing in additional detail portions of one of the blocks shown in FIG. 1A, this block being designated as "PACDAC" in FIG. 1A.

FIG. 9A is a block diagram showing in additional detail the composite video output portion of PACDAC 140. The PACDAC 140 receives packets from the display memory 1128 over line 138. These packets may represent digital composite video data, graphics or control information. The type of the packet is determined by signals on line 160 from the PACDAC controller 218 which are received by FIFO write control 901.

The output from the FIFO write control 901 is provided to control FIFO 902 and video FIFO 904 over line 906. The signal on line 906 indicates which FIFO should accept a packet provided to the control FIFO 902 and video FIFO 904 over line 138. When the "Packet Type" signal on line 160 indicates that a digital composite video packet is being received, the packet is buffered in video FIFO 904. When the "Packet Type" signal on line 160 indicates that a control packet is being received, the packet is buffered in control FIFO 902. Similarly, a graphics FIFO (not shown) may be provided to receive a graphics packet. By providing multiple FIFOs and FIFO write control 901 packet switching among different types of packets may be achieved for a serial stream of data packets on line 138. In an alternative embodiment, a single FIFO or buffer could be provided and the "Packet Type" signal on line 160 could be used to direct the data when it is read out of the FIFO or buffer. Of course, where only composite video signal output is to be supported, packet switching may not be necessary and a simplified PACDAC or DAC stage may be used to produce a composite video signal.

The buffering of packets in FIFOs additionally allows the transfer rate between the display memory 128 to be decoupled from the pixel output rate. Thus, packets may be transferred at a high rate to the different FIFOs and output from the PACDAC at a slower rate. This provides higher bandwidth across line 138 and allows the PACDAC to support both graphics and video. In addition, during run length decoding, the video FIFO 904 can be filled and the line 138 can then be freed for other uses, such as transferring graphics or control packets.

Packets of control information may be read out of control FIFO 902 by control logic 908 over line 910. This control information may be used to control the settings and operation of the PACDAC 140. The control logic 908 is connected to clock generator 912. Clock generator 912 provides 24.576 MHz and 16.944 MHz clock signals to control logic 908 across lines 914 and 916 respectively. These clock signals are also provided to the media stream controller 114 across clock line 172. The control logic 908 uses these clock signals to control the pixel output rate. Either a 12.288 MHz or 16.944 MHz pixel output rate clock is generated by control logic 908 and provided on line 918. The 12.288 MHz pixel rate is generated by dividing the 24.576 MHz clock from line 914 in half. Control information received from control FIFO 902 by control logic 908 determines which of the 12.288 MHz or 16.944 MHz pixel output rates will be provided on line 918.

The control logic 908 controls the video FIFO 904 and a run length decoder 920 via line 921. In addition, the pixel output rate is provided to run length decoder 920 over line 918. The run length decoder reads data out of the FIFO using lines 922 and 924 and outputs it to DAC 926 across line 928 at the pixel sample rate. The DAC 926 receives run length decoded digital composite video data on line 928 and converts it to analog form. This produces an analog composite video signal which is output at port 142 which is designated as "NTSC/PAL Out". This signal may be provided to an NTSC or PAL video device using standard filtering techniques as necessary.

A packet of digital composite video data is initially received by video FIFO 904 from line 138. When a packet of digital composite video data is received on line 138, signals on the "Packet Type" line 160 will indicate that the type of packet is digital composite video. FIFO Write Control 901 will receive the signals from line 160 and provide a corresponding signal on line 906 indicating that video FIFO 904 should accept the packet. A line 150 labelled VRDY is provided from the video FIFO 904 to the NTSC/PAL video out module 207 of the media stream controller 114 to regulate the amount of video data received by video FIFO 904. VRDY is asserted when the video FIFO is less than half full. When VRDY is asserted, the NTSC/PAL video out module 207 sends enough video data to fill the video FIFO 904 and then waits until VRDY is once again asserted before sending additional video packets. This helps prevent the video FIFO 904 from overflowing. If the video FIFO 904 does overflow or underflow, an error signal may be placed in a status register (not shown) and provided to the media stream controller 114 over the $I^2C$ bus 170 (shown in FIG. 1A).

In the first embodiment, the data from video FIFO 904 is provided to the run length decoder 920 one byte at a time over line 924. The run length decoder requests data from video FIFO 904 by asserting a request signal on line 922. Video FIFO 904 responds by providing the next byte of data on line 924. Preferably, the maximum rate of data transfer from video FIFO 904 to run length decoder 920 is much higher than the pixel output rate.

The run length decoder 920 then expands any run length encoding in the data stream and provides it to DAC 926 over line 928. As described previously for the first embodiment, each data transfer is prefaced by a twenty-four (24) bit RLE code containing a twelve (12) bit count, some control flags, and an initial run sample. These values are loaded by the run length decoder 920 into a count register 930, a flags register 932 and a data register 934, respectively. If the flags indicate that the RLE code is run length encoded, the run length decoder 920 stops requesting data from video FIFO 904. The run length decoder 920 then repeats the value in the data register 934 for the number of pixel output cycles indicated by the count register 930. For each pixel output cycle, the run length encoded data is repeated on line 928 and the count in count register 930 is decreased by one. When the count in the count register 930 is exhausted, a new RLE code is requested from video FIFO 904 via line 922. The new RLE code is loaded from line 924 by run length decoder 920.

If the RLE code contains a PCM escape flag, the run length decoder 920 continues to request data from the video FIFO 904 for the number of pixel output cycles indicated by the count of count register 930. For the first pixel output cycle, the data value from the RLE code is provided to the DAC 926. Then for the number of cycles indicated by the count, additional data values are read from the video FIFO 904, loaded into data register 934, and provided to DAC 926 on line 928. Each pixel output cycle, the count in the count register 930 is decreased by one. When the count is exhausted a new RLE code is requested from video FIFO 904. This system allows compressed RLE data and uncompressed PCM data to be intermingled in a single video stream.

The DAC 926 converts each of the digital data samples received on line 928 to analog values using techniques well-known in the art. The resulting output in the first embodiment is an NTSC or PAL composite video signal. Of course, as described previously, other video formats may be supported due to the flexible design of the system. In particular, it should be noted that the structure of PACDAC 140 is not dependent on the video format used.

Further, by simply providing DAC 926 and the video FIFO 904, along with a modest amount of logic in the run length decoder 920, the PACDAC 140 enables a significant reduction in the bandwidth required from system components such as a disk and the local bus 106.

Figure 9B:
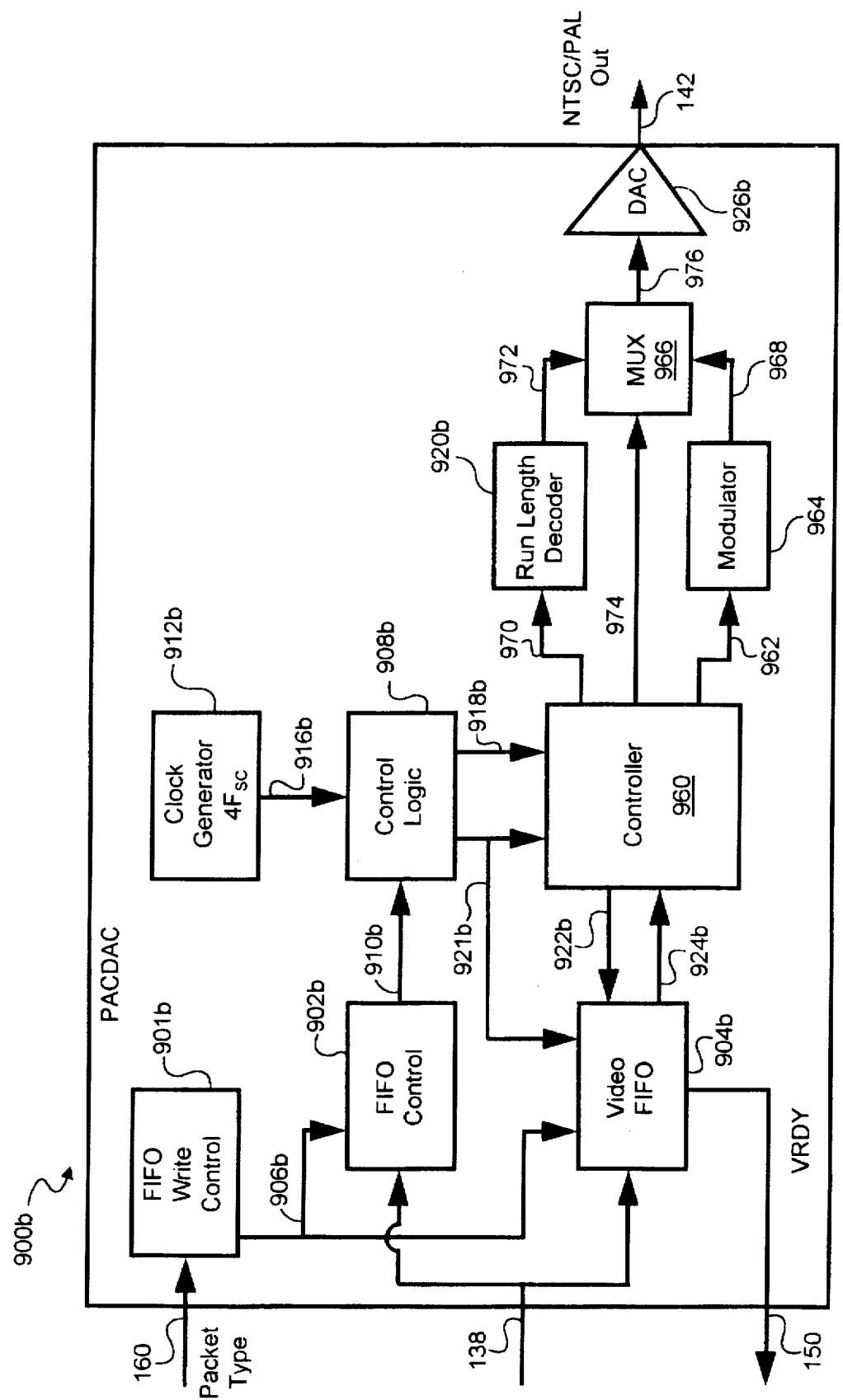
FIG. 9B is a block diagram showing in additional detail portions of an alternative "PACDAC" in FIG. 1A.

FIG. 9B is a simplified block diagram showing a PACDAC 900b for use in an alternative embodiment of the present invention. The PACDAC 900b includes several stages corresponding to the stages of PACDAC 140 shown in FIG. 9A. These stages are identified with the same reference numbers used for the corresponding stages in FIG. 9A, although an additional suffix "b" has been added to those reference numerals in FIG. 9B. These stages have functionality similar to that described above with reference to FIG. 9A.

However, in the alternative embodiment a clock generator 912b generates a pixel output rate that allows for simplified chrominance modulation. Preferably, in the alternative embodiment, a clock signal that is an integer multiple of $F_{sc}$ is provided over line 160. In particular a clock with a frequency of four times $F_{sc}$ is preferably provided. While this does not allow the audio clock to be used, it does allow greatly simplified chrominance modulation. In particular, the values of sin ωt and cos ωt used for modulation are reduced to alternating values of −1,0, and 1. Thus, in the alternative embodiment, a chrominance look-up table is not required. The NTSC/PAL video out module 207 in the media stream controller 114 simply stores the Y, U and V values as unmodulated component pixel data in a frame buffer. Unmodulated component pixel data may then be sent to the video FIFO 904b of the PACDAC 900b over line 138. A controller 960 is provided for receiving data from video FIFO 904b. Data is requested on line 922b and received on line 924b. Unmodulated, non-RLE video pixel data may then be sent to the modulator 964 across line 962. Depending upon the pixel output cycle, the modulator 964 will invert, set to zero, or leave unchanged the U and V components as appropriate for modulation. The modulator 964 will then add the Y, U and V components to form a modulated digital composite video pixel. This modulated video data is provided to MUX 966 on line 968.

RLE data may still be provided for vertical and horizontal control information as described in the first embodiment. This RLE data will be sent from controller 960 to run length decoder 920b over line 970 for decoding as described previously. The run length decoded video data is provided to MUX 966 over line 972. The controller 960 controls MUX 974 by providing a selection signal to MUX 966 over line 974. Depending on the selection signal on line 974, MUX 966 will either pass data from line 968 or line 972 to DAC 926b over line 976. Data from the other of line 968 or line 972 is blocked by MUX 966. The controller 960 controls MUX 966 to selectively pass modulated digital composite pixel data from line 968 and run length decoded video control information from line 972 at the pixel output rate to produce a properly formatted stream of digital composite video data on line 976. DAC 926b then converts the digital composite video data into an analog composite video signal which is output at port 142.

By moving the modulation to the PACDAC 900b in the alternative embodiment, the complexity of the overall system is greatly reduced. In particular, the NTSC/PAL video out module 207 does not require a table look-up mechanism to generate modulated chrominance. However, the alternative embodiment may require an additional clock signal than otherwise provided in the system of the first embodiment.

The foregoing description is presented to enable any person skilled in the art to make and use the invention. Descriptions of specific designs are provided only as examples. Various modifications to the preferred embodiment will be readily apparent to those skilled in the art, and the generic principles defined herein may be applied to other embodiments and applications without departing from the spirit and scope of the invention. Thus, the present invention is not intended to be limited to the embodiments shown, but is to be accorded the widest scope consistent with the principles and features disclosed herein.

For instance, an additional alternative embodiment may be provided where a simplified modulator (using a pixel sample rate that is four times $F_{sc}$) is provided in the NTSC/PAL video out module rather than in the PACDAC 900b. Such a system would still provide simplified logic, but would also allow the video data to be stored in the display memory in modulated form. Such a system would further allow a simpler PACDAC to be used than in the alternative embodiment shown in FIG. 9B.

In addition, a buffer other than the VRAM of a display memory may be provided for storing video data. This may allow a video output system according to the present invention to be developed independently of the graphics and sound systems in cases where that may be desirable.

It will also be realized that the techniques of the present invention are broadly applicable and are not limited to any particular video formats, bus systems or computer architectures. Aspects of the present invention may be applicable any time it is desirable to support generation of composite video signals from digital data. In addition, the techniques of providing a template of frequently used data in a display memory may be applied in numerous situations even where the data does not represent video.

While this invention has been described and illustrated with reference to particular embodiments, it will be readily apparent to those skilled in the art that the scope of the present invention is not limited to the disclosed embodiments but, on the contrary, is intended to cover numerous other modifications and equivalent arrangements which are included within the spirit and scope of the following claims.

We claim:

1. A system for generating composite pixel data from component pixel data, said component pixel data having separate sets of luminance component data and chrominance component data, said system comprising:

a memory device for storing a table of modulated chrominance components;

means for associating said set of chrominance component data with a set of modulated values obtained from said table of modulated chrominance components; and means for combining said set of modulated values and said set of luminance component data to form said composite pixel data.

2. The system of claim 1 wherein each of said modulated values corresponds to a product of one of said chrominance component data with a sinusoidal value of a predetermined frequency.

3. The system of claim 1 wherein said means for combining comprises an adder for adding said luminance component data and said modulated values.

4. The system of claim 3 wherein said means for associating comprises:

a first register for storing a first chrominance component data;

a second register for storing an index corresponding to a discrete value of time; and a circuit for returning a value identified by said first and said second registers.

5. The system of claim 4 wherein said means for associating further comprises:

a third register for storing a second chrominance component; and a circuit for returning a value identified by said second and said third registers.

6. The system of claim 4 wherein said first, said second, and said third registers are disposed on a single integrated circuit.

7. A system for generating composite pixel data from component pixel data, said component pixel data having separate sets of luminance component data and chrominance component data, said system comprising:

a memory device for storing a table of modulated chrominance components;

a first register for storing a first chrominance component data;

a second register for storing a second chrominance component data;

a third register for storing an index corresponding to a discrete value of time;

a circuit for using said first and said third registers to determine a first address in said memory device and using said second and said third registers to determine a second address in said memory device, said circuit outputting a first modulated value stored in said first address and a second modulated value stored in said second address; and an adder for forming a combined modulated chrominance by adding said first and said second modulation values.

8. The system of claim 7 further comprising a circuit for combining said combined modulated chrominance and one of said luminance component data to form said composite pixel data.

9. The system of claim 7 wherein each of said modulated values corresponds to a product of one of said chrominance component data with a sinusoidal value of a predetermined frequency.

10. A method for generating composite pixel data from component pixel data, said component pixel data having separate sets of luminance component data and chrominance component data, comprising the steps of:

loading a memory device with a table of modulated chrominance components;

receiving said set of chrominance component data;

obtaining a set of modulated values from said table of modulated chrominance components which are associated with said received chrominance component data;

receiving said luminance component data; and combining said received luminance component data with said set of modulated values to form said composite pixel data.

11. The method of claim 10 further comprising the step of performing a gamma correction on said component pixel data.

12. The method of claim 10 wherein said combining step comprises the step of forming sums of members of said set of luminance component data and members of said set of modulated values.

13. A system for generating analog composite pixel data from digital component pixel data having a sample frequency corresponding to an integer multiple of a carrier frequency, said digital component pixel data having separate sets of digital luminance component data and digital chrominance component data wherein said chrominance component data requires modulation, said system comprising:

means for generating a first set of modulated data by changing a sign bit of selected members of said set of chrominance component data;

an adder for generating a digital composite pixel data by adding member s of said set of digital luminance component data and m embers of said first set of modulated data; and a digital-to-analog converter for converting said digital composite pixel data to said analog composite pixel data.

14. The system of claim 13 further comprising means for generating a second set of modulated data by selecting members from said set of chrominance component data which are different from said selected members associated with said first set of modulated data; and wherein said adder further for adding members of said second set of modulated data and members of said set of digital luminance component data.

15. The system of claim 13 further comprising a clock having a frequency equal to said integer multiple of said carrier frequency, and means in response to said clock for transmitting said digital composite pixel data to said digital-to-analog converter.

16. The system of claim 13 further comprising a first-in-first-out buffer, coupled to said means for generating, for accepting said chrominance component data at a first data rate and delivering said accepted chrominance component data to said means for generating at a second data rate.

17. A method for generating analog composite pixel data from digital component pixel data, said digital component pixel data having separate sets of luminance component data and chrominance component data which need to be modulated in accordance with a carrier frequency, said system comprising the steps of:

generating a first set of modulated data by changing a sign bit of selected members of said set of chrominance component data;

adding members of said set of luminance component data and members of said first set of modulated data to generate a first set of digital composite pixel data; and converting said first set of digital composite pixel data to said analog composite pixel data.

18. The method of claim 17 further comprising the steps of:

generating a second set of modulated data by selecting members from said set of chrominance component data which are different from said selected members associated with said first set of modulated data;

adding members of said set of luminance component data and members of said second set of modulated data to generate a second set of digital composite pixel data; and converting said second set of digital composite pixel data to said analog composite pixel data.

* * * * *